(12) United States Patent
Hanioka et al.

(10) Patent No.: US 11,223,312 B2
(45) Date of Patent: Jan. 11, 2022

(54) ROTARY MACHINE CONTROL DEVICE

(71) Applicant: Mitsubishi Electric Corporation, Tokyo (JP)

(72) Inventors: Shota Hanioka, Tokyo (JP); Masahiro Iezawa, Tokyo (JP); Kodai Katagiri, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/980,439

(22) PCT Filed: Apr. 5, 2019

(86) PCT No.: PCT/JP2019/015079
§ 371 (c)(1),
(2) Date: Sep. 14, 2020

(87) PCT Pub. No.: WO2019/216074
PCT Pub. Date: Nov. 14, 2019

(65) Prior Publication Data
US 2021/0013823 A1    Jan. 14, 2021

(30) Foreign Application Priority Data

May 7, 2018    (JP) .............................. JP2018-089289

(51) Int. Cl.
*H02P 25/22* (2006.01)
*H02P 25/18* (2006.01)
*H02K 3/28* (2006.01)

(52) U.S. Cl.
CPC .............. *H02P 25/22* (2013.01); *H02P 25/18* (2013.01); *H02K 3/28* (2013.01)

(58) Field of Classification Search
CPC ................................ H02P 25/22; H02P 25/18
See application file for complete search history.

(56) References Cited

U.S. PATENT DOCUMENTS

| | | | | |
|---|---|---|---|---|
| 4,392,099 A | * | 7/1983 | Kuniyoshi | ................ H02P 6/20 318/797 |
| 8,264,114 B2 | * | 9/2012 | Taniguchi | ................ H02K 3/28 310/184 |

(Continued)

FOREIGN PATENT DOCUMENTS

| | | |
|---|---|---|
| JP | 2013-034280 A | 2/2013 |
| JP | 2016-208664 A | 12/2016 |

(Continued)

OTHER PUBLICATIONS

International Search Report and Written Opinion dated Jul. 9, 2019 for PCT/JP2019/015079 filed on Apr. 5, 2019, 9 pages including English Translation of the International Search Report.

(Continued)

*Primary Examiner* — Thai T Dinh
(74) *Attorney, Agent, or Firm* — Xsensus LLP

(57) ABSTRACT

In a rotary machine control device for controlling a rotary machine having a multi-group multiphase configuration, a phase difference θcoil of 150° to 210° (excluding 180°) is electrically provided between a winding for an odd-number group and a winding for an even-number group in the rotary machine, wherein, when the effective value of a voltage command is smaller than a voltage threshold, the phase difference between the voltage commands for the respective groups is set to 180°, and when a torque command is greater than a torque threshold, the phase difference between the voltage commands for the respective groups is set to θcoil.

20 Claims, 20 Drawing Sheets

(56) References Cited

U.S. PATENT DOCUMENTS

| 9,231,513 | B2* | 1/2016 | Baba | H02P 25/22 |
|---|---|---|---|---|
| 2013/0033210 | A1* | 2/2013 | Suzuki | B62D 5/0403 |
| | | | | 318/400.22 |
| 2013/0285591 | A1* | 10/2013 | Suzuki | H02P 6/10 |
| | | | | 318/724 |
| 2018/0358915 | A1 | 12/2018 | Ishizuka | |
| 2019/0068018 | A1 | 2/2019 | Hori et al. | |

FOREIGN PATENT DOCUMENTS

| WO | 2017/141513 A1 | 8/2017 |
|---|---|---|
| WO | 2017/168574 A1 | 10/2017 |

OTHER PUBLICATIONS

Han, D., et al., "Common Mode Voltage Cancellation in PWM Motor Drives with Balanced Inverter Topology," IECON2016, 2016, pp. 4313-4318.

\* cited by examiner

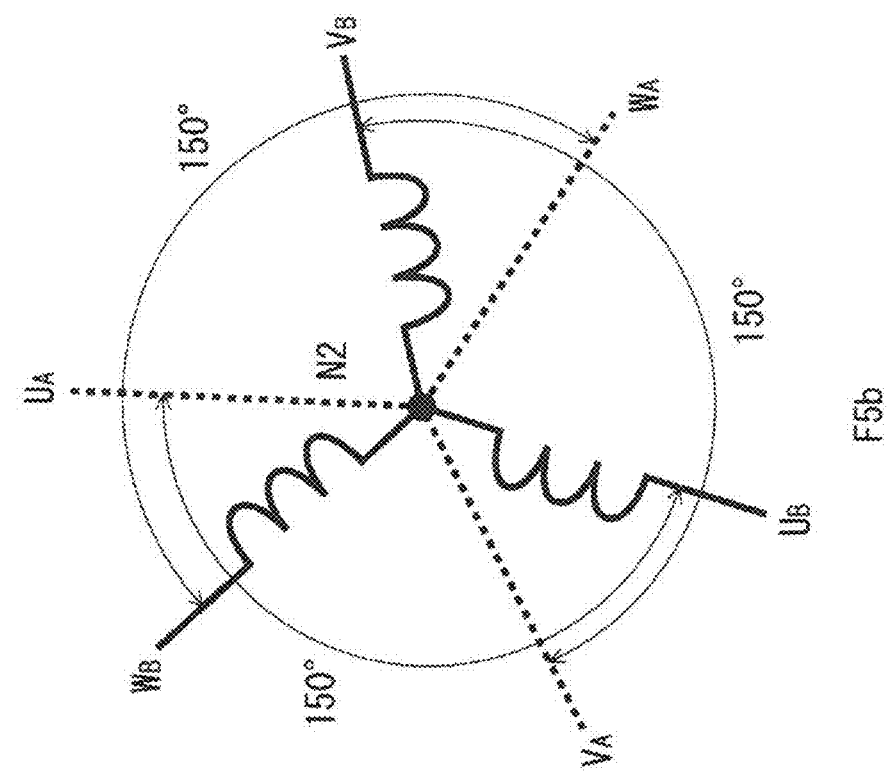
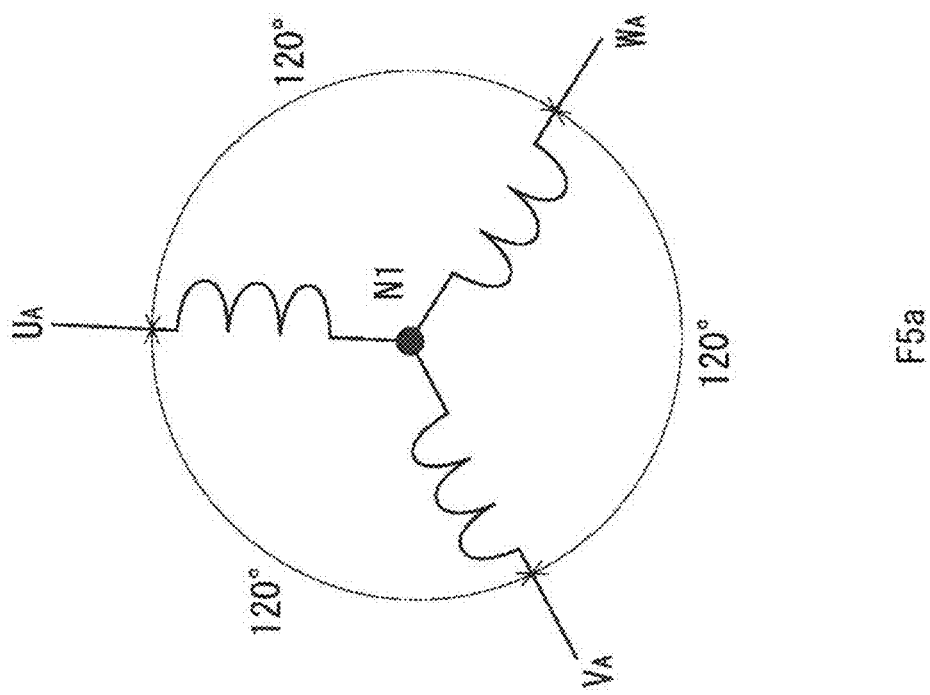
FIG. 5

FIG. 16
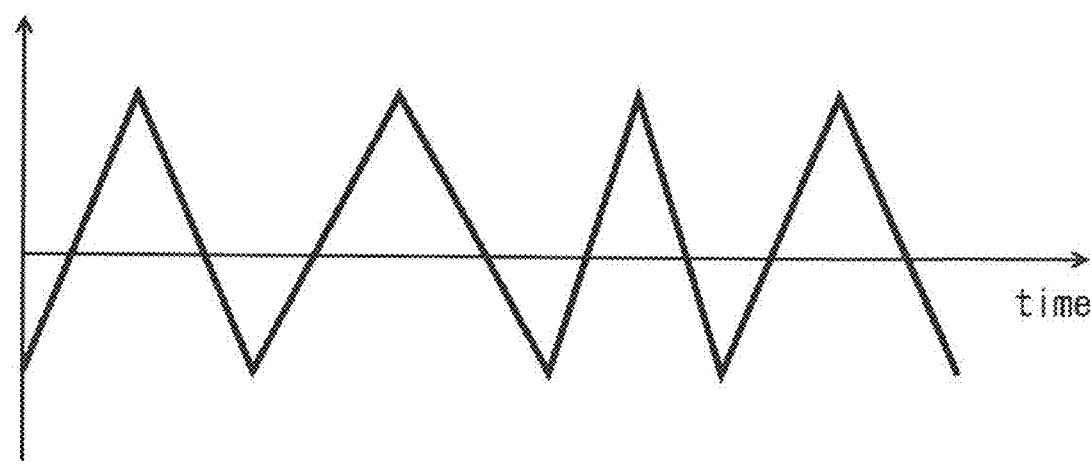
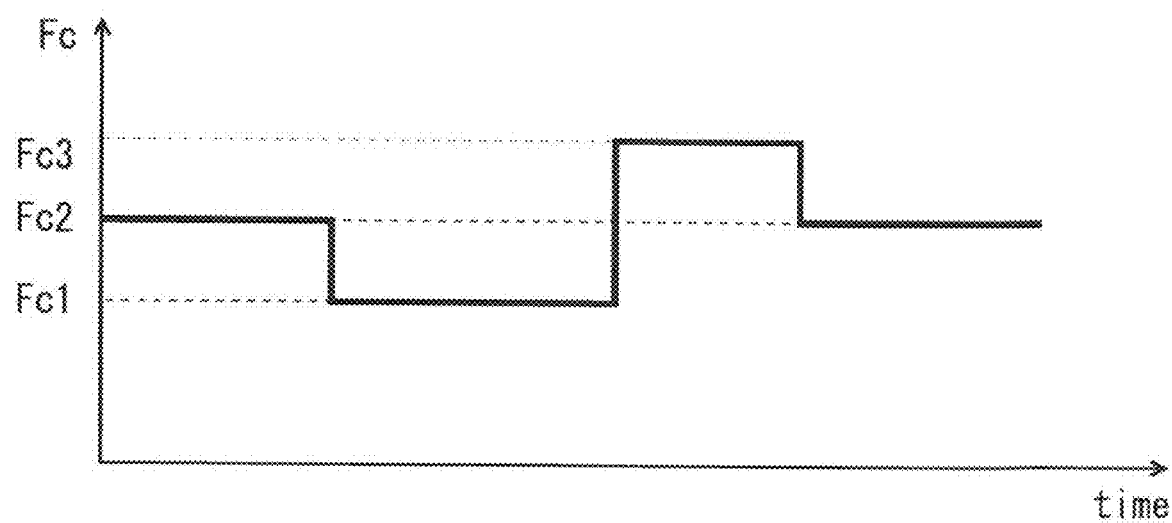

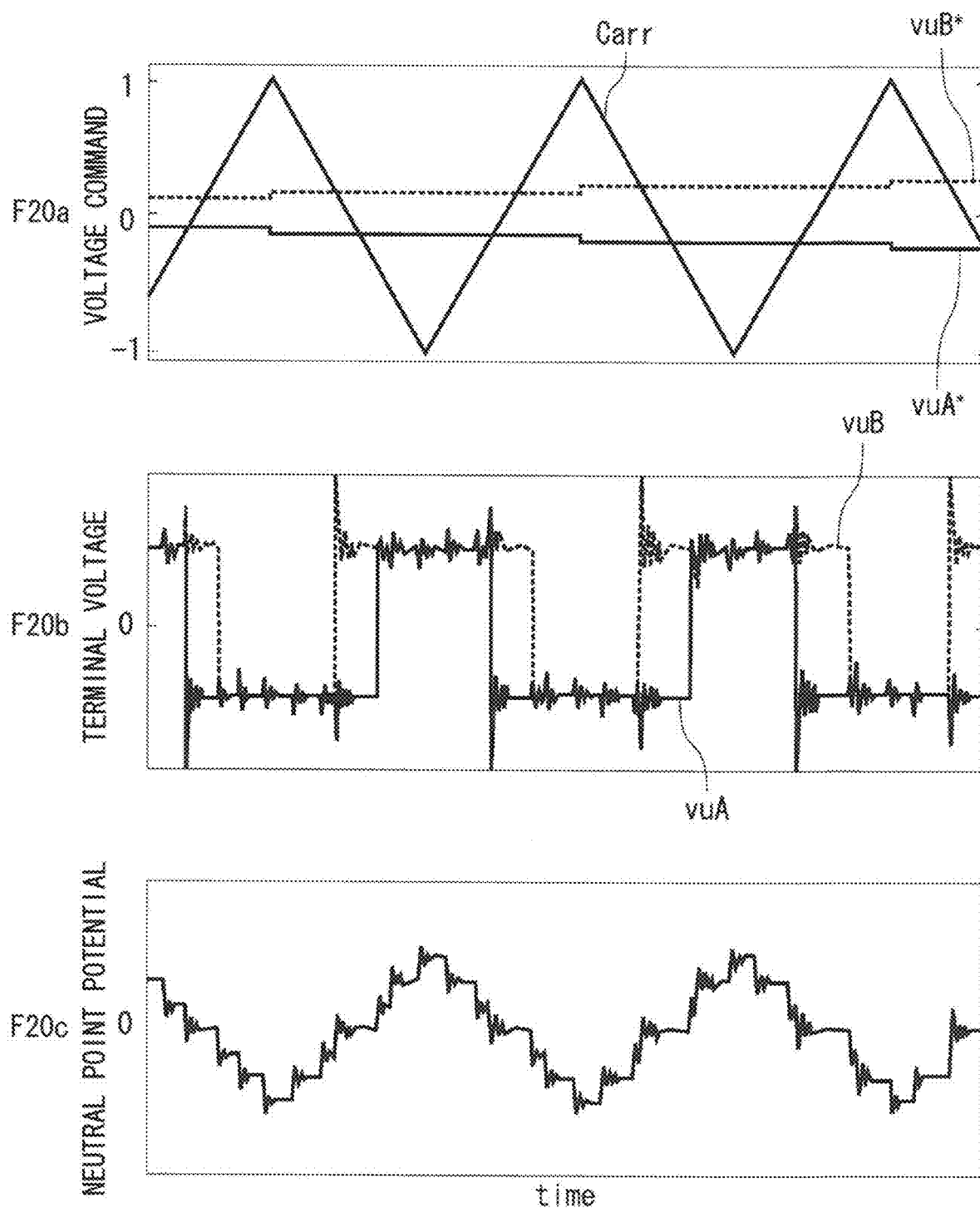

ROTARY MACHINE CONTROL DEVICE

CROSS-REFERENCE TO RELATED APPLICATIONS

The present application is based on PCT filing PCT/JP2019/015079, filed Apr. 5, 2019, which claims priority to JP 2018-089289, filed May 7, 2018, the entire contents of each are incorporated herein by reference.

TECHNICAL FIELD

The present application relates to a rotary machine control device for controlling a rotary machine having a multi-group multiphase winding configuration.

BACKGROUND ART

In a converter in which output voltage is controlled through ON/OFF switching of switching elements, electromagnetic noise occurs due to switching operation. Standards for electromagnetic noise are specified on a product-classification basis. Therefore, when electromagnetic noise occurring in the power converter exceeds a specified value, it is necessary to take measures. Taking measures using a noise filter causes a problem concerning the providing space and cost therefor.

To solve this problem, proposed is a technology of reducing electromagnetic noise by reversing carriers that determine ON and OFF of switching elements between the phases in which winding arrangements are electrically different by 180° in a rotary machine with a multi-group multiphase winding structure (for example, Patent Document 1).

In addition, a technology of reducing torque ripple by applying voltages such that a phase difference corresponding to the winding phases is provided between voltage phases for respective groups is proposed (for example, Patent Document 2).

CITATION LIST

Patent Document

Patent Document 1: Japanese Laid-Open Patent Publication No. 2016-208664 (paragraphs [0053] to [0055] and FIGS. 8 and 9)

Patent Document 2: Japanese Laid-Open Patent Publication No. 2013-034280 (paragraphs [0025] to [0027] and FIG. 5)

SUMMARY OF THE INVENTION

Problems to be Solved by the Invention

However, in the configuration disclosed in Document 1, when the number of poles and the number of slots of a motor are set to such a combination as to increase output torque (for example, structure of 10 poles and 12 slots), the electric phase difference between respective groups of windings cannot be 180°, and therefore this configuration is not applicable. Meanwhile, in the configuration disclosed in Document 2, the phase difference of voltage commands is not set to 180°, and therefore there is a problem that the effect of reducing electromagnetic noise is not obtained.

The present application has been made to solve the above problem, and an object of the present application is to provide a rotary machine control device that reduces electromagnetic noise occurring in a drive system for a rotary machine while maintaining maximum torque of the rotary machine.

Solution to the Problems

A rotary machine control device according to the present application is a rotary machine control device for controlling a rotary machine having a multi-group multiphase configuration, the rotary machine control device including: a power converter formed by connecting a plurality of phase legs in parallel, each phase leg having an upper arm switching element and a lower arm switching element connected in series to each other; and a control unit for generating switching signals for switching the upper arm switching elements and the lower arm switching elements, to control the rotary machine, wherein a phase difference $\theta coil$ in a range of $150° \leq \theta coil < 180°$ or $180° < \theta coil \leq 210°$ is electrically provided between a winding for an odd-number group and a winding for an even-number group in the rotary machine, and a phase difference between a voltage command for the odd-number group and a voltage command for the even-number group in the rotary machine is switched between 180° and $\theta coil$.

Effect of the Invention

In the rotary machine control device according to the present application, the phase difference $\theta coil$ in a range of $150° \leq \theta coil < 180°$ or $180° < \theta coil \leq 210°$ is electrically provided between the winding for the odd-number group and the winding for the even-number group in the rotary machine, and the phase difference between the voltage command for the odd-number group and the voltage command for the even-number group in the rotary machine is switched between 180° and $\theta coil$. Thus, it is possible to provide a rotary machine control device capable of applying control for suppressing electromagnetic noise in a drive condition that electromagnetic noise increases, and outputting maximum torque in a condition that maximum torque is required.

BRIEF DESCRIPTION OF THE DRAWINGS

FIG. 5 illustrates an electric phase difference between windings relevant to the rotary machine control device according to embodiment 1.

FIG. 16 illustrates changing of a carrier frequency in the rotary machine control device according to embodiment 1.

FIG. 20 illustrates voltage commands, terminal voltages, and a neutral point potential when the phase difference between voltage commands for the respective groups is 0° in the rotary machine control device according to embodiment 1.

DESCRIPTION OF EMBODIMENTS

Embodiment 1

Figure 1:
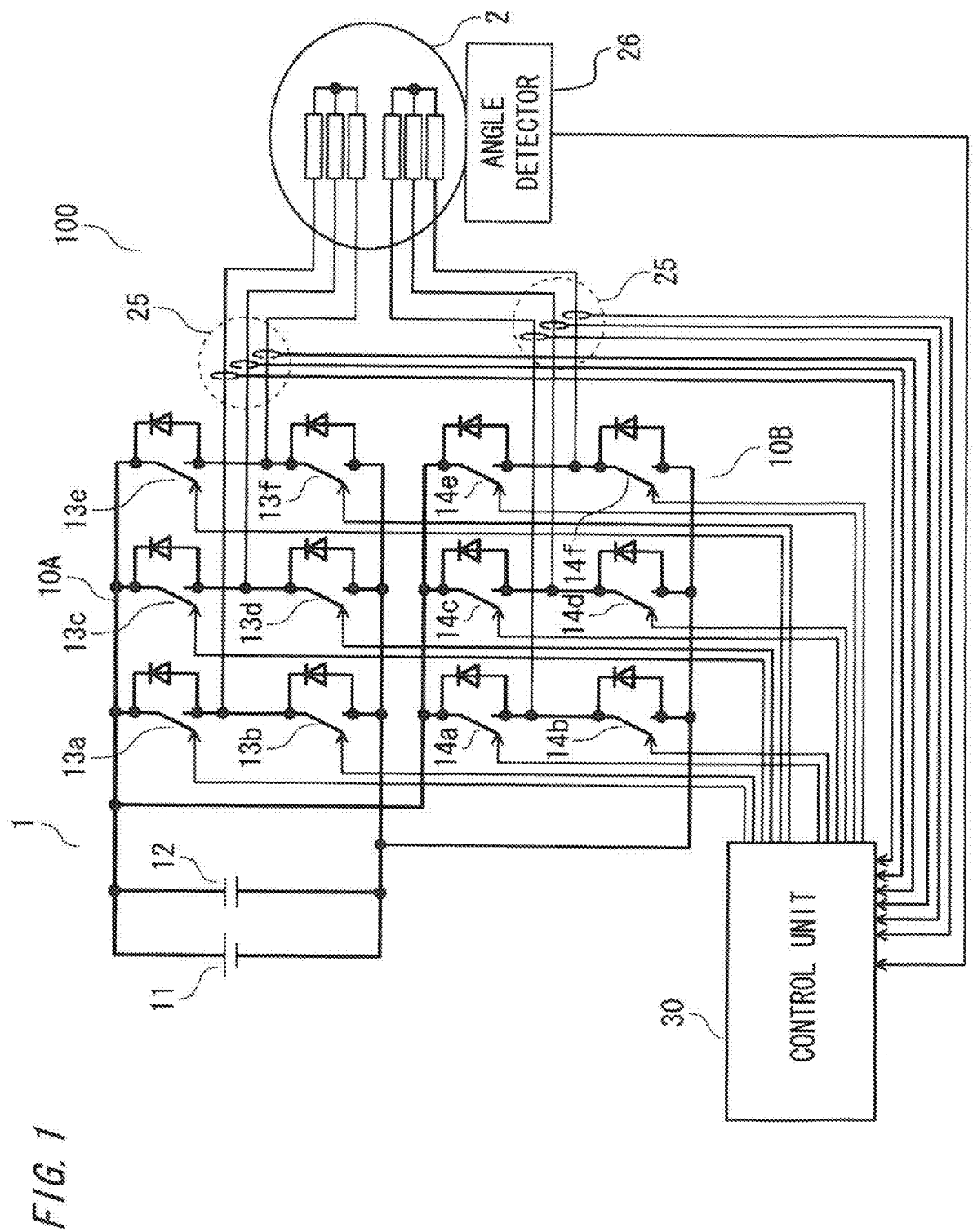
FIG. 1 is a configuration diagram of a rotary machine drive system of a rotary machine control device according to embodiment 1.

Embodiment 1 relates to a rotary machine control device for controlling a rotary machine having a two-group three-phase configuration, wherein a phase difference θcoil of 150° to 210° (excluding 180°) is electrically provided between the respective groups of windings, and when the effective value of a voltage command is smaller than a voltage threshold, the phase difference between voltage commands for the respective groups is set to 180°, and when a torque command is greater than a torque threshold, the phase difference between voltage commands for the respective groups is set to θcoil.

Hereinafter, the configuration and operation of the rotary machine control device according to embodiment 1 will be described with reference to FIG. 1 which is a configuration diagram of a rotary machine drive system, FIG. 2 which is a structure view of a rotor having a ten-pole structure, FIG. 3 which is a structure view of a stator having a twelve-slot structure, FIG. 4 which illustrates windings with a ten-pole twelve-slot structure and the phase of an interlinkage magnetic flux, FIG. 5 which illustrates an electric phase difference between windings, FIG. 6 which illustrates windings with an eight-pole twelve-slot structure and the phase of an interlinkage magnetic flux, FIG. 7 which is a function block diagram of a control unit, FIG. 8 which is a detailed block diagram of the control unit, FIG. 9 which illustrates change in the phase difference between voltage commands for the respective groups, FIG. 10 which illustrates change (with hysteresis) in the phase difference between the voltage commands, FIG. 11 and FIG. 12 which illustrate comparative examples, FIG. 13 which illustrates the case where the phase difference between the voltage commands for the respective groups is 180°, FIG. 14 which illustrates the case where the phase difference between the voltage commands for the respective groups is 150°, FIG. 15 which illustrates windings with a twenty-poles twenty-four-slot structure and the phase of an interlinkage magnetic flux, FIG. 16 which shows changing of a carrier frequency, FIG. 17 which shows delays of rising times and falling times of terminal voltages in group A and group B, FIG. 18 which is a function block diagram for correcting delays of rising times and falling times of terminal voltages in group A and group B, FIG. 19 which illustrates voltage commands, terminal voltages, and a neutral point potential when the phase difference between voltage commands for the respective groups is 180°, and FIG. 20 which illustrates voltage commands, terminal voltages, and a neutral point potential when the phase difference between voltage commands for the respective groups is 0°.

First, the entire configuration of a rotary machine drive system including the rotary machine control device according to embodiment 1 will be described with reference to FIG. 1. In embodiment 1, an example in which the rotary machine control device is applied to a system for driving a rotary machine with a double three-phase winding structure having three-phase windings for two groups, i.e., group A and group B, will be described.

The rotary machine is not a component of the rotary machine control device, but is closely relevant to the rotary machine control device in terms of operation, and therefore will be described without being particularly separated.

Figure 2:
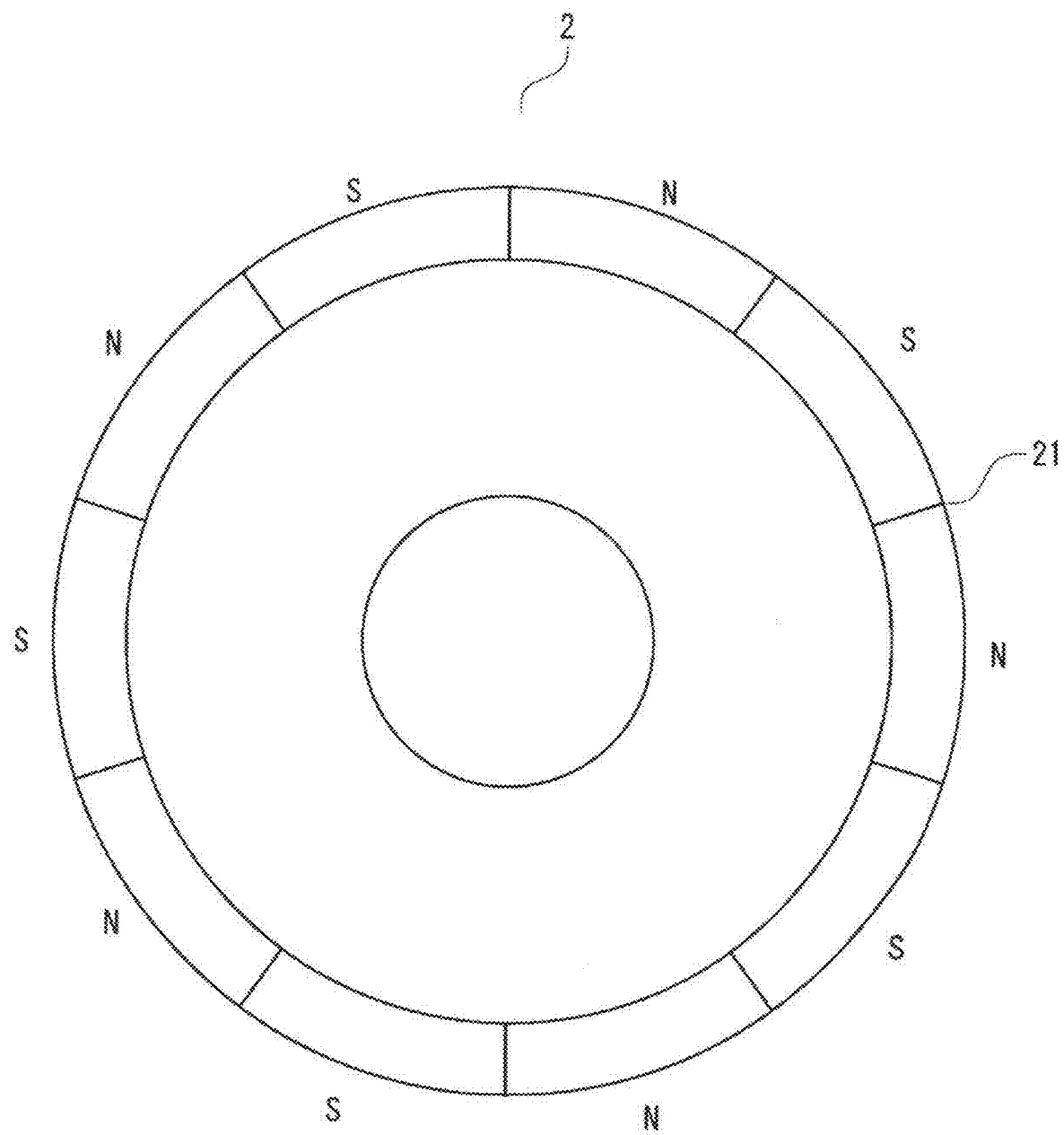
FIG. 2 is a structure view of a rotor having a ten-pole structure, relevant to the rotary machine control device according to embodiment 1.

In FIG. 1, a rotary machine drive system 100 includes a rotary machine control device 1 and a rotary machine 2.

The rotary machine control device 1 includes two power converters 10A, 10B for converting DC power to three-phase AC power to drive the rotary machine 2, and a control unit 30 for controlling the power converters 10A, 10B.

DC buses of the power converters 10A, 10B are connected to a common DC power supply 11. The DC buses are provided with a common smoothing capacitor 12 connected in parallel to the DC power supply 11.

Next, the configurations of the power converters 10A, 10B will be described.

The power converter 10A includes a U-phase upper arm switching element 13a, a U-phase lower arm switching element 13b, a V-phase upper arm switching element 13c, a V-phase lower arm switching element 13d, a W-phase upper arm switching element 13e, and a W-phase lower arm switching element 13f. The upper and lower arm switching elements (e.g., U-phase upper arm switching element 13a and U-phase lower arm switching element 13b) for each phase are connected in series to each other, and the upper and lower arm switching elements for each phase connected in series to each other are connected in parallel to the DC buses.

Similarly, the power converter 10B includes a U-phase upper arm switching element 14a, a U-phase lower arm switching element 14b, a V-phase upper arm switching element 14c, a V-phase lower arm switching element 14d, a W-phase upper arm switching element 14e, and a W-phase lower arm switching element 14f. The upper and lower arm switching elements for each phase are connected in series to each other, and the upper and lower arm switching elements for each phase connected in series to each other are connected in parallel to the DC buses.

As the switching elements, semiconductor switching elements such as metal-oxide silicon field-effect transmitters (MOSFET) and insulated gate bipolar transistors (IGBT) are applied. In addition, antiparallel diodes are connected to the respective switching elements.

Next, the structures of a rotor 21 and a stator 22 of the rotary machine 2 will be described.

The structure of the rotor 21 in the present embodiment 1 will be described with reference to FIG. 2.

The rotor 21 of the rotary machine 2 has a ten-pole structure in which five pole pairs of magnets are alternately arranged in the circumferential direction, with each pole pair composed of N pole and S pole.

The structure of the stator 22 in the present embodiment 1 will be described with reference to FIG. 3.

The stator 22 of the rotary machine 2 has a twelve-slot structure having twelve salient poles around which windings are wound. The winding wound at each slot of the stator 22 has only one terminal at each of the winding start and the winding end.

Next, the phase of a winding interlinkage magnetic flux and the electric phase difference between group A and group B in the rotary machine 2 having a ten-pole twelve-slot structure, will be described with reference to FIG. 4 and FIG. 5.

Figure 3:
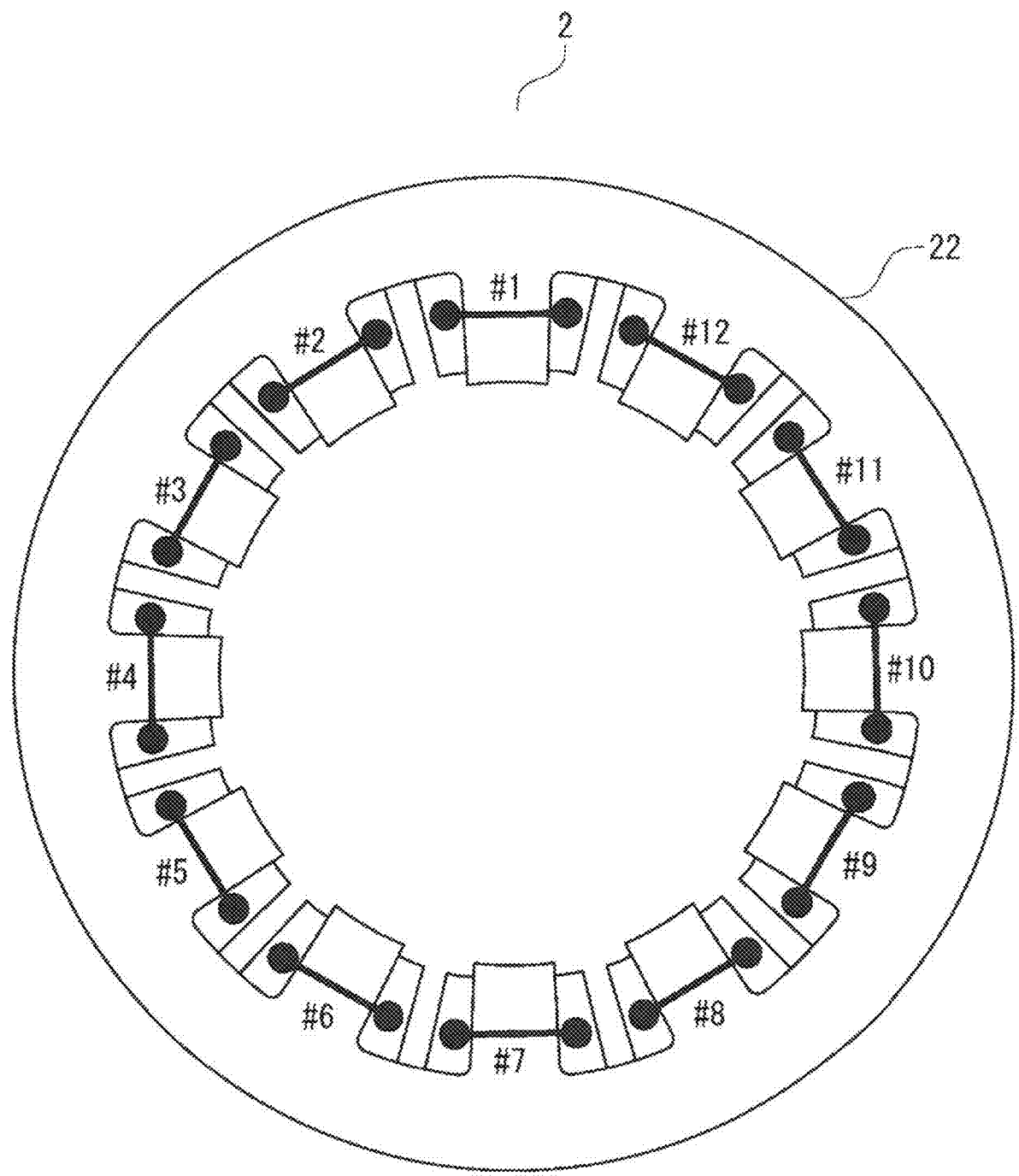
FIG. 3 is a structure view of a stator having a twelve-slot structure, relevant to the rotary machine control device according to embodiment 1.
Figure 4:
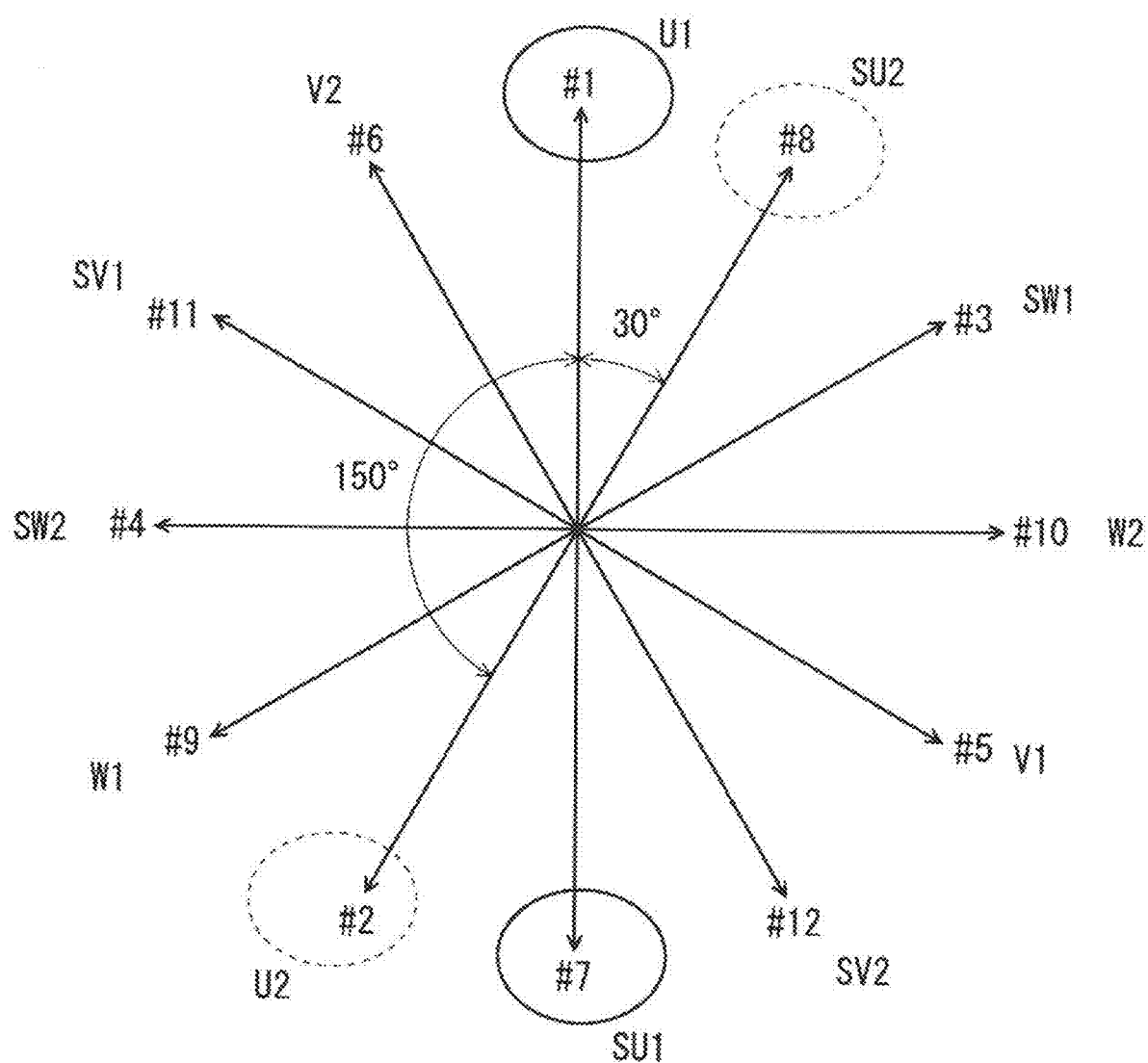
FIG. 4 illustrates windings with a ten-pole twelve-slot structure and the phase of an interlinkage magnetic flux, relevant to the rotary machine control device according to embodiment 1.

FIG. 4 shows the phase of a winding interlinkage magnetic flux in the ten-pole twelve-slot structure, where the slots at which windings are wound are denoted by #1 to #12 on the stator 22 shown in FIG. 3.

The stator windings in the present embodiment 1 are wound in the same direction at the slots. In the rotary machine 2 having a ten-pole twelve-slot structure, the electric phase difference between the interlinkage magnetic fluxes of the windings wound in the same direction at the adjacent slots (e.g., #1 and #2) is 150° (360×5 (number of pole pairs)/12 (number of slots)).

In the case of winding windings at the slots where the interlinkage magnetic fluxes are maximized for each phase in each group, considering maximization of output torque, a U-phase winding for group A is wound at the slots #1, #7, a V-phase winding is wound at the slots #5, #11, and a W-phase winding is wound at the slots #9, #3.

In addition, a U-phase winding for group B is wound at the slots #2, #8, a V-phase winding is wound at the slots #6, #12, and a W-phase winding is wound at the slots #10, #4.

In FIG. 4, S indicates that the phase is reversed (phase difference 180°). That is, phase SU1 is reversed from U1. Phases SV1, SW1 are reversed from V1, W1, and phases SU2, SV2, SW2 are reversed from U2, V2, W2.

Regarding the electric phase difference in windings for group A, windings wound in the same direction such that the V-phase winding at the slot #5 is at −120° and the W-phase winding at the slot #9 is at −240° relative to the U-phase winding at the slot #1, are connected at their winding ends, to form a neutral point among the windings for group A.

Regarding U phase in group A, the winding start and the winding end of the windings at the slots #1, #7 are connected so that the phase difference of the interlinkage magnetic fluxes becomes 0°, to form two-parallel one-series windings. That is, the point at which the winding start of the winding at the slot #1 and the winding end of the winding at the slot #7 are connected is used as a winding terminal for U phase in group A.

Regarding V phase in group A, the winding start and the winding end of the windings at the slots #5, #11 are connected so that the phase difference of the interlinkage magnetic fluxes becomes 0°, to form two-parallel one-series windings. That is, the point at which the winding start of the winding at the slot #5 and the winding end of the winding at the slot #11 are connected is used as a winding terminal for V phase in group A.

Regarding W phase in group A, the winding start and the winding end of the windings at the slots #9, #3 are connected so that the phase difference of the interlinkage magnetic fluxes becomes 0°, to form two-parallel one-series windings. That is, the point at which the winding start of the winding at the slot #9 and the winding end of the winding at the slot #3 are connected is used as a winding terminal for W phase in group A.

Regarding the electric phase difference in windings for group B, windings wound in the same direction such that the V-phase winding at the slot #6 is at −120° and the W-phase winding at the slot #10 is at −240° relative to the U-phase winding at the slot #2, are connected at their winding ends, to form a neutral point among the windings for group B.

Regarding U phase in group B, the winding start and the winding end of the windings at the slots #2, #8 are connected so that the phase difference of the interlinkage magnetic fluxes becomes 0°, to form two-parallel one-series windings. The point at which the winding start of the winding at the slot #2 and the winding end of the winding at the slot #8 are connected is used as a winding terminal for U phase in group B.

Regarding V phase in group B, the winding start and the winding end of the windings at the slots #6, #12 are connected so that the phase difference of the interlinkage magnetic fluxes becomes 0°, to form two-parallel one-series windings. The point at which the winding start of the winding at the slot #6 and the winding end of the winding at the slot #12 are connected is used as a winding terminal for V phase in group B.

Regarding W phase in group B, the winding start and the winding end of the windings at the slots #10, #4 are connected so that the phase difference of the interlinkage magnetic fluxes becomes 0°, to form two-parallel one-series windings. The point at which the winding start of the winding at the slot #10 and the winding end of the winding at the slot #4 are connected is used as a winding terminal for W phase in group B.

In the present embodiment 1, when the rotary machine 2 having ten poles and twelve slots is formed with the winding structure described above, an electric phase difference θcoil between the windings for group A and group B is 150°, as shown in F5a and F5b in FIG. 5.

Figure 6:
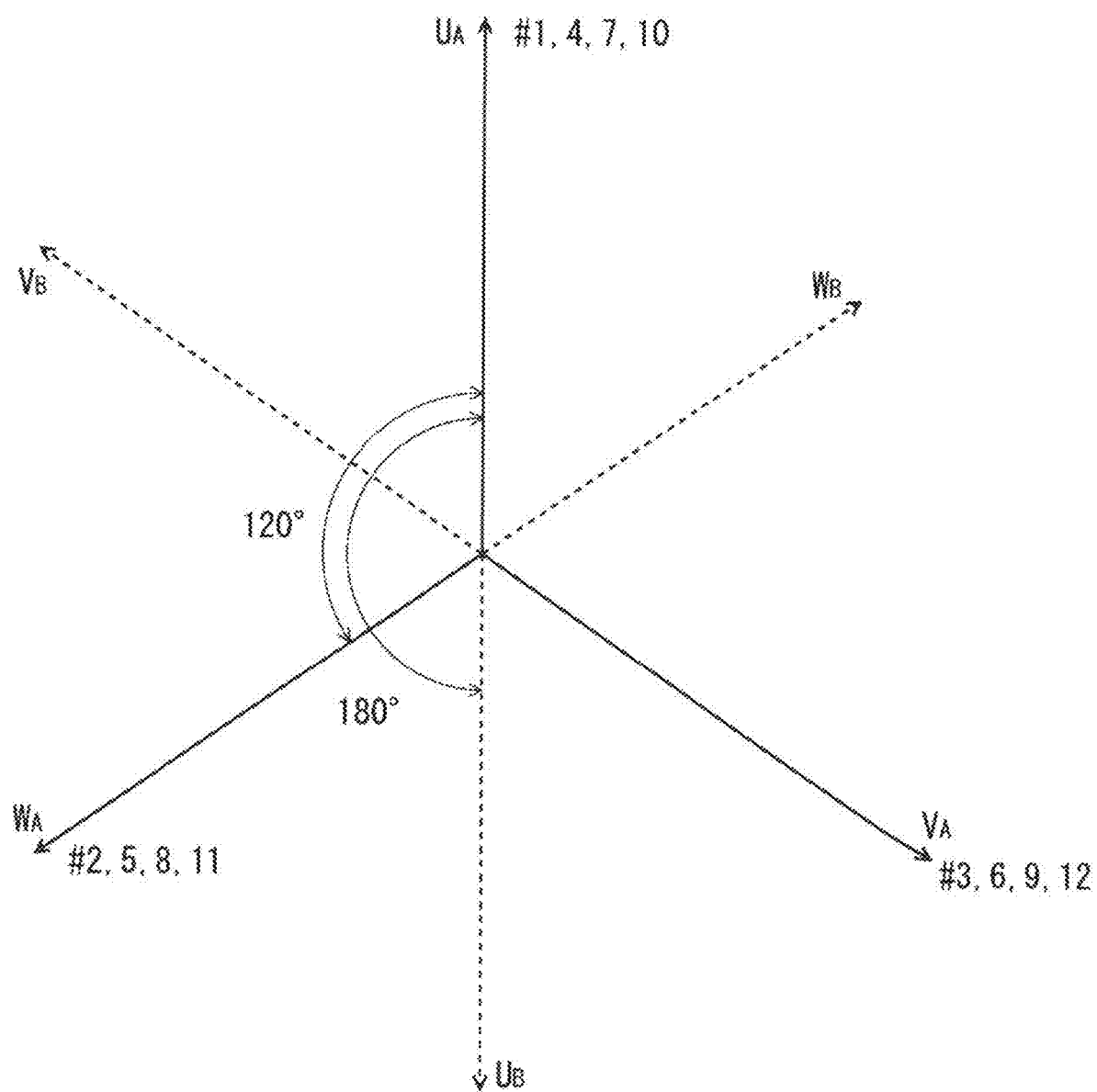
FIG. 6 illustrates windings with an eight-pole twelve-slot structure and the phase of an interlinkage magnetic flux, relevant to the rotary machine control device according to embodiment 1.

It is noted that, for example, for eight-pole twelve-slot structure, when windings are formed in the same manner as described above, the electric phase difference θcoil between the windings for group A and group B is 180° as shown in FIG. 6.

In this case, because the electric phase difference θcoil between the windings for group A and group B is 180°, the rotary machine control device 1 of the present embodiment 1 is not applicable.

Next, connection between each winding terminal for the respective phases in group A and group B and the power converters 10A, 10B will be described with reference to FIG. 1.

The winding terminal for U phase in group A is connected to the connection point between the upper and lower arms for U phase in the power converter 10A. The winding terminal for V phase is connected to the connection point between the upper and lower arms for V phase in the power converter 10A. The winding terminal for W phase is connected to the connection point between the upper and lower arms for W phase in the power converter 10A.

Similarly, the winding terminal for U phase in group B is connected to the connection point between the upper and lower arms for U phase in the power converter 10B. The winding terminal for V phase is connected to the connection point between the upper and lower arms for V phase in the power converter 10B. The winding terminal for W phase is connected to the connection point between the upper and lower arms for W phase in the power converter 10B.

As shown in FIG. 1, currents for the respective phases in group A and group B in the rotary machine 2 are detected by current detectors 25.

The rotor angle of the rotor 21 of the rotary machine 2 is detected by an angle detector 26 provided to the rotary machine 2.

Next, the configuration and function of the control unit 30 of the rotary machine control device 1 will be described with reference to FIG. 7 and FIG. 8.

Figure 7:
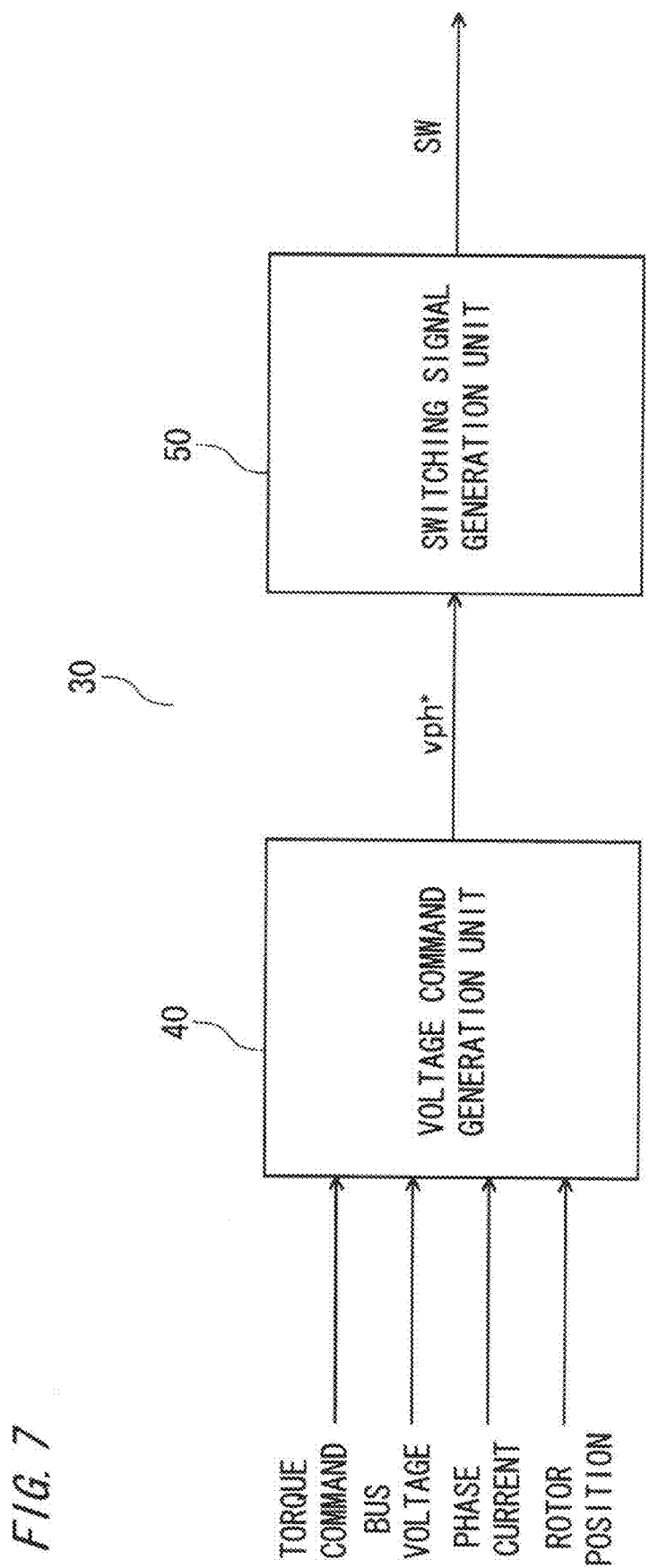
FIG. 7 is a function block diagram of a control unit in the rotary machine control device according to embodiment 1.

FIG. 7 shows a function block diagram of the control unit 30 of the rotary machine control device 1 in the present embodiment 1. FIG. 8 shows a detailed block diagram of the control unit 30.

First, the summary of the function of the control unit 30 will be described with reference to FIG. 7, and then the details of the configuration and function of, in particular, a voltage command generation unit 40 of the control unit 30 will be described with reference to FIG. 8.

The control unit 30 includes the voltage command generation unit 40 and a switching signal generation unit 50.

The voltage command generation unit 40 generates voltage commands vuA*, vvA*, vwA*, vuB*, vvB*, vwB* (normalized by Vdc/2) for the respective phases on the basis of a torque command inputted from outside, bus voltage Vdc of the DC buses of the power converters 10A, 10B, two-group three-phase current values iuA, ivA, iwA, iuB, ivB, iwB detected by the current detectors 25, and an electric angle θele of the rotor 21 detected by the angle detector 26.

In FIG. 7, vuA* to vwB* are simply expressed as vph*. In FIG. 1, a detector for the bus voltage Vdc of the DC buses is not shown.

The switching signal generation unit 50 generates switching signals SWUPA, SWUNA, SWVPA, SWVNA, SWWPA, SWWNA and SWUPB, SWUNB, SWVPB, SWVNB, SWWPB, SWWNB to be given to the switching elements of the upper and lower arms for the respective phases, on the basis of the voltage commands (vuA*, vvA*, vwA*, vuB*, vvB*, vwB*) for the respective phases. In FIG. 7, SWUPA to SWWNB are simply expressed as SW.

Next, the details of the configuration and function of the voltage command generation unit 40 will be described.

The voltage command generation unit 40 includes a table 41 for conversion, an intergroup voltage phase difference determination unit 42, uvw-dq coordinate converters 43A, 43B, proportional integral (PI) controllers 44A, 44B, dq-uvw coordinate converters 45A, 45B, and a voltage command selection unit 46.

It is noted that the components for group A are affixed with "A" and the components for group B are affixed with "B".

Figure 8:
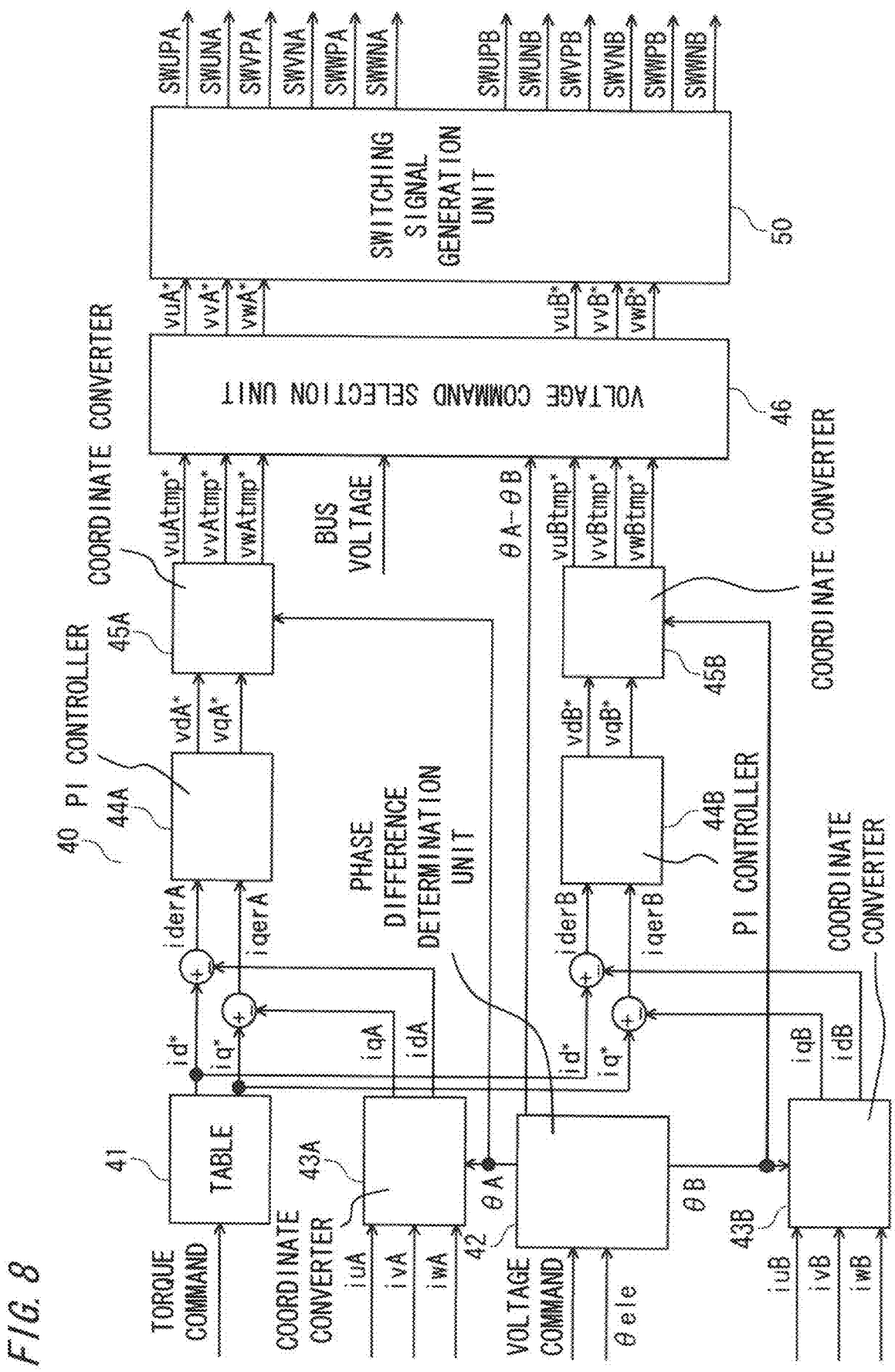
FIG. 8 is a detailed block diagram of a control unit in the rotary machine control device according to embodiment 1.

In FIG. 8, the intergroup voltage phase difference determination unit is abbreviated as "phase difference determination unit", and the uvw-dq coordinate converter and the dq-uvw coordinate converter are abbreviated as "coordinate converter".

On the basis of the torque command inputted from outside and a reference phase difference θA-θB between group A and group B, a d-axis current command id* and a q-axis current command iq* are calculated by the table 41.

The table 41 outputs output data on a one-to-one correspondence basis with respect to the input data (torque command and reference phase difference θA-θB).

In FIG. 8, a line through which the reference phase difference θA-θB is outputted from the intergroup voltage phase difference determination unit 42 to the table 41 is not shown, for ease of understanding of the drawing.

Next, the procedure for generating the voltage commands for the respective phases in group A will be described.

The uvw-dq coordinate converter 43A performs coordinate conversion on the basis of a reference phase θA and detected currents iuA, ivA, iwA for group A, to generate dq-axis currents idA, iqA for group A.

The PI controller 44A performs PI control on iderA, iqerA which are the differences between the current commands id*, iq* outputted from the table 41 and the dq-axis currents idA, iqA outputted from the coordinate converter 43A, to calculate dq-axis voltage commands vdA*, vqA*.

The dq-uvw coordinate converter 45A performs coordinate conversion on the basis of the dq-axis voltage commands vdA*, vqA* calculated by the PI controller 44A and an angle (θA+we×180/π×Ts) obtained by advancing the reference phase θA by one cycle, to calculate voltage commands vuAtmp*, vvAtmp*, vwAtmp* for the respective phases in group A.

Here, we is the electric angle frequency, and Ts is the control cycle.

Next, similarly, the procedure for generating voltage commands for the respective phases in group B will be described.

The uvw-dq coordinate converter 43B performs coordinate conversion on the basis of the reference phase θB and detected currents iuB, ivB, iwB for group B, to generate dq-axis currents idB, iqB for group B.

The PI controller 44B performs PI control on iderB, iqerB which are the differences between the current commands id*, iq* outputted from the table 41 and the dq-axis currents idB, iqB outputted from the coordinate converter 43B, to calculate dq-axis voltage commands vdB*, vqB*.

The dq-uvw coordinate converter 45B performs coordinate conversion on the basis of the dq-axis voltage commands vdB*, vqB* calculated by the PI controller 44B and an angle (θB+we×Ts) obtained by advancing the reference phase θB by one cycle, to calculate voltage commands vuBtmp*, vvBtmp*, vwBtmp* for the respective phases in group B.

Next, the function and operation of the intergroup voltage phase difference determination unit 42 regarding the reference phases θA, θB will be described.

The intergroup voltage phase difference determination unit 42 determines the voltage phase difference between group A and group B and the reference phases θA, θB for group A and group B, on the basis of an effective value vdq* of the dq-axis voltage commands for group A, a voltage threshold vth, and the electric angle θele of the rotor.

Here, $vdq^* = \sqrt{((vdA^*)^2 + (vqA^*)^2)}$.

(A) Case of $vdq^* \leq vth$ $\theta A = \theta ele$ $\theta B = \theta ele - 180$ (B) Case of $vdq^* > vth$ $\theta B = \theta ele + ((180 - \theta coil)/2)$ $\theta B = \theta ele - 180 - ((180 - \theta coil)/2)$ The voltage threshold vth is determined in consideration of a torque threshold Trqth, and the condition (B) includes a condition that the output torque of the rotary machine 2 is greater than the torque threshold Trqth at which improvement is needed for the output torque.

The voltage threshold vth may be set at a modulation factor of 20% to 30% at which electromagnetic noise begins to reduce, for example.

Although the effective value vdq* of the dq-axis voltage commands for group A is used in the above description, the effective value $(\sqrt{((vdB^*)^2+(vqB^*)^2)})$ of the dq-axis voltage commands for group B may be used.

In shifting from state (A) to state (B) or from state (B) to state (A), if the reference phases θA, θB are changed stepwise, a current pulsation occurs. To solve this problem, as shown in FIG. 9, the change is gradually performed in a ramp shape over an optional time tswp, whereby the current pulsation can be suppressed.

In the above description, the voltage phase difference between group A and group B and the reference phases θA, θB for group A and group B are determined through comparison between the voltage threshold vth and the effective value vdq* of the dq-axis voltage commands for group A.

However, when the effective value vdq* of the dq-axis voltage commands for group A is smaller than the voltage threshold vth, the state (A) may be applied, and when the torque command is greater than the torque threshold Trqth, the state (B) may be applied.

In a normal operation, there is no case where the effective value vdq* of the dq-axis voltage commands for group A and the torque command are required to be in states contradicting each other (for example, the effective value vdq* of the dq-axis voltage commands for group A is smaller than the voltage threshold vth while the torque command is greater than the torque threshold Trqth). However, this can be reliably avoided by determining, in advance, which of the effective value vdq* of the dq-axis voltage commands for group A and the torque command is prioritized, on the basis of the specifications of the rotary machine 2 or the specifications of the rotary machine control device 1.

Next, the function and operation of the voltage command selection unit 46 will be described. It is noted that the bus voltage is inputted to the voltage command selection unit 46 for normarizing the voltage command by Vdc/2.

(C) Case of $\theta A - \theta B = 180°$

Voltage commands for generating switching signals for the respective phases in group A and group B are calculated using Expression (1) to Expression (6).

$$vuA^* = vuAtmp^* \quad (1)$$

$$vvA^* = vvAtmp^* \quad (2)$$

$$vwA^* = vwAtmp^* \quad (3)$$

$$vuB^* = -vuAtmp^* \quad (4)$$

$$vvB^* = -vvAtmp^* \quad (5)$$

$$vwB^* = -vwAtmp^* \quad (6)$$

(D) Case of θA−θB=value other than 180°

Voltage commands for the respective phases in group A and group B are calculated using Expression (7) to Expression (12).

$$vuA^* = vuAtmp^* \quad (7)$$

$$vvA^* = vvAtmp^* \quad (8)$$

$$vwA^* = vwAtmp^* \quad (9)$$

$$vuB^* = vuBtmp^* \quad (10)$$

$$vvB^* = vvBtmp^* \quad (11)$$

$$vwB^* = vwBtmp^* \quad (12)$$

Figure 10:
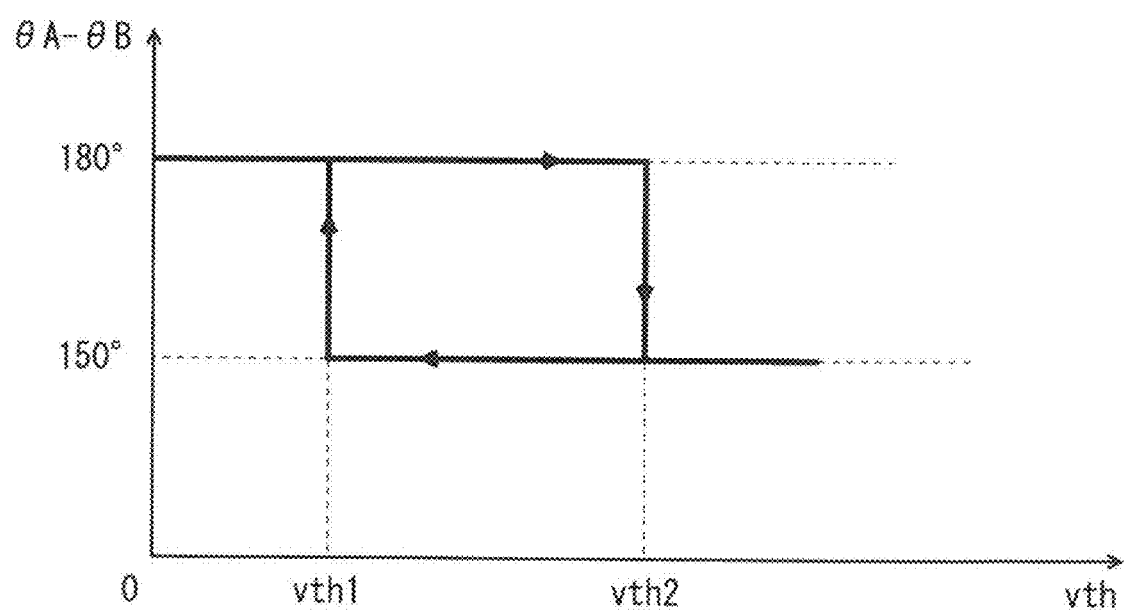
FIG. 10 illustrates change (with hysteresis) in the phase difference between the voltage commands in the rotary machine control device according to embodiment 1.

In shifting from state (C) to state (D) or from state (D) to state (C), hysteresis may be provided as shown in FIG. 10.

In FIG. 10, when the effective value vdq* of the dq-axis voltage commands for group A becomes smaller than a first voltage threshold vth1, θA-θB changes from 150° to 180°, and when the effective value vdq* of the dq-axis voltage commands for group A becomes greater than a second voltage threshold vth2, θA-θB changes from 180° to 150°.

Figure 9:
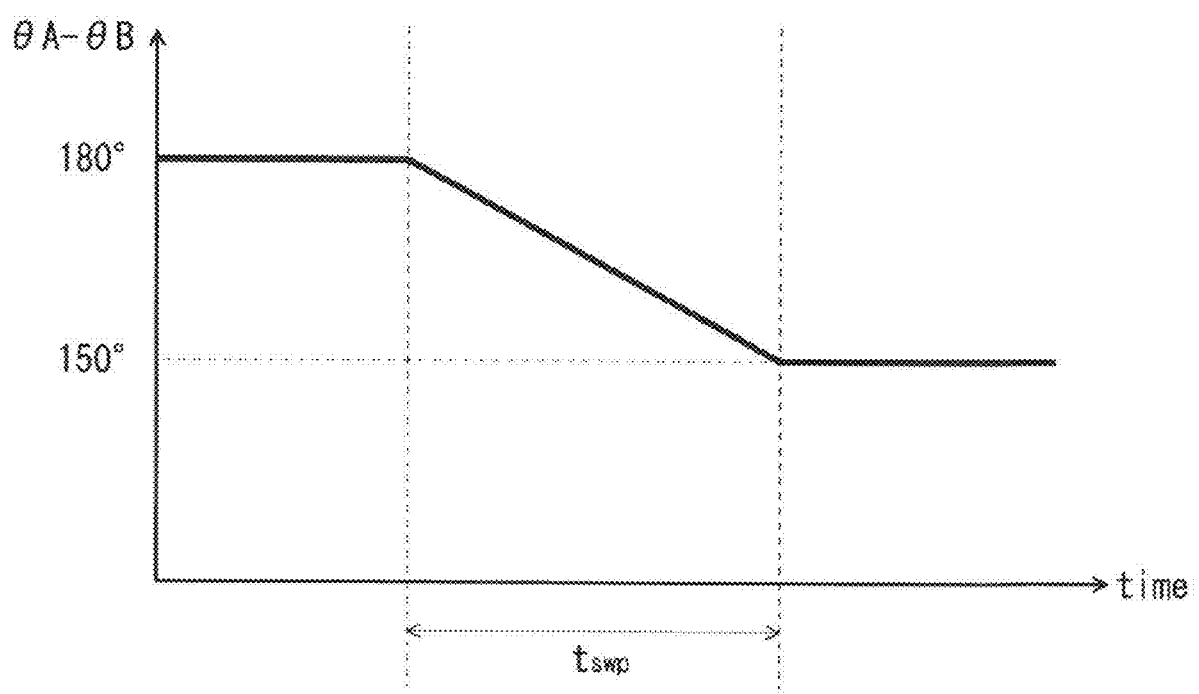
FIG. 9 illustrates change in the phase difference between voltage commands for the respective groups in the rotary machine control device according to embodiment 1.

If these changes are gradually performed in a ramp shape over an optional time as described in FIG. 9, a current pulsation can be suppressed.

Here, comparative examples will be described for clarifying operation of the rotary machine control device 1 in the present embodiment 1.

Figure 11:
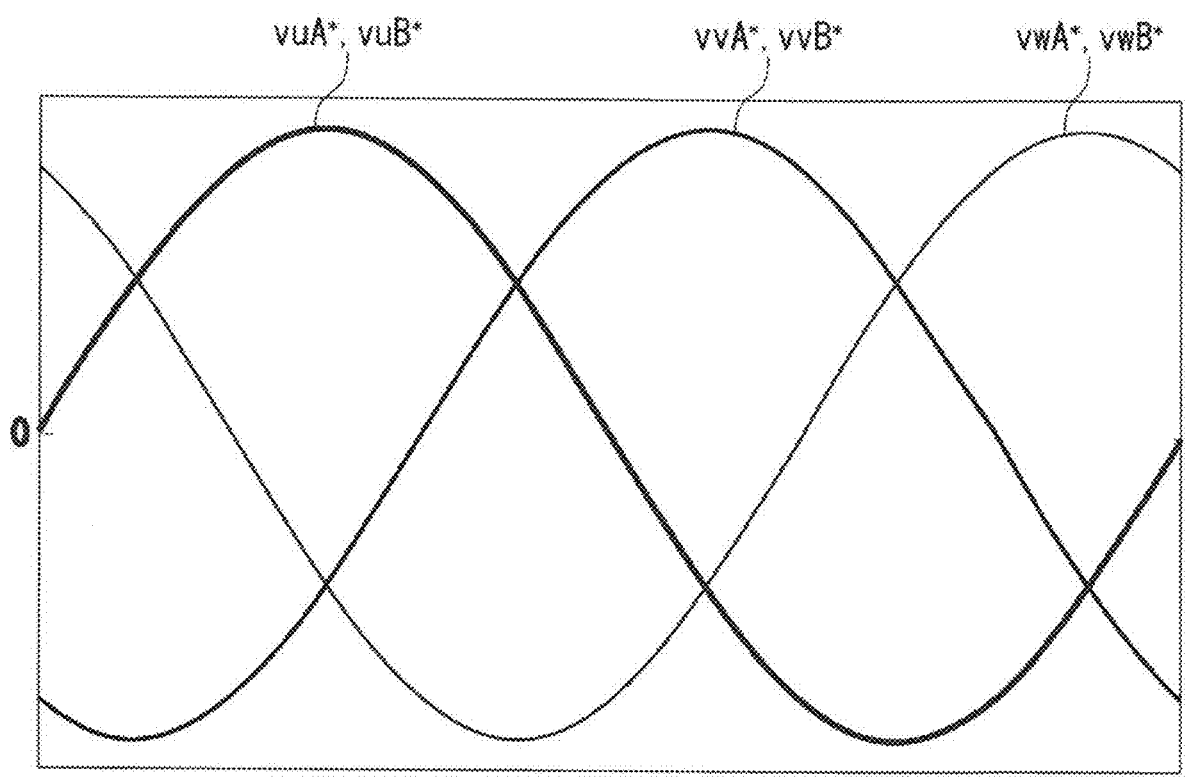
FIG. 11 illustrates a comparative example (the phase difference between voltage commands for respective groups is 0°) relevant to the rotary machine control device according to embodiment 1.
Figure 12:
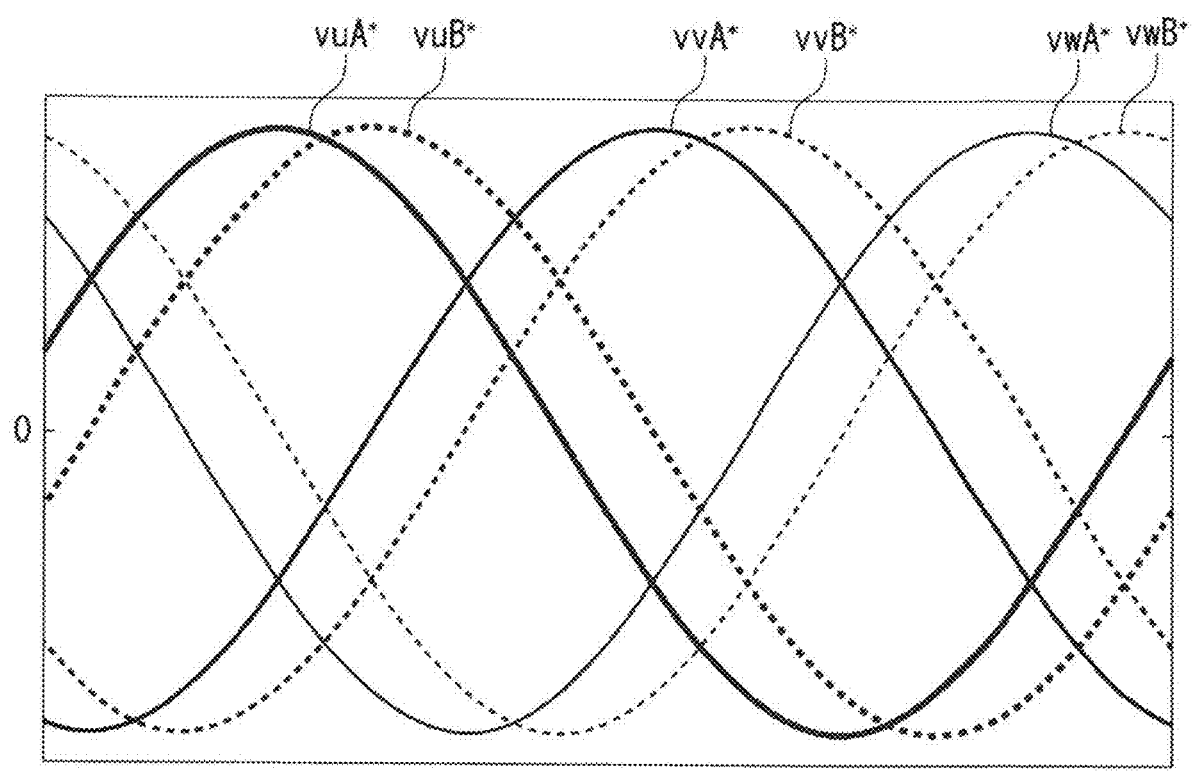
FIG. 12 illustrates a comparative example (the phase difference between voltage commands for respective groups is 30°) relevant to the rotary machine control device according to embodiment 1.

FIG. 11 is a graph showing voltage commands when the voltage command phase difference between group A and group B is 0°. FIG. 12 is a graph showing voltage commands when the voltage command phase difference between group A and group B is 30°.

Figure 13:
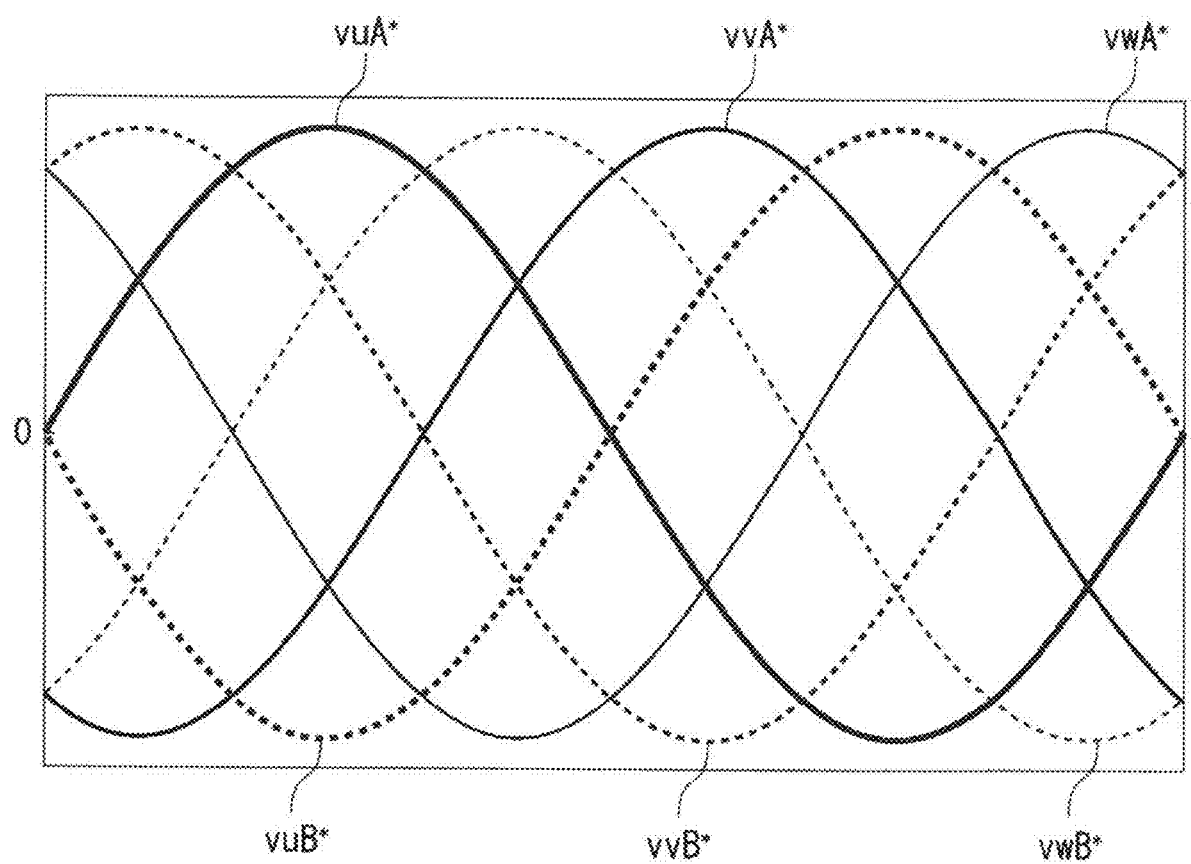
FIG. 13 illustrates the case where the phase difference between the voltage commands for the respective groups is 180° in the rotary machine control device according to embodiment 1.
Figure 14:
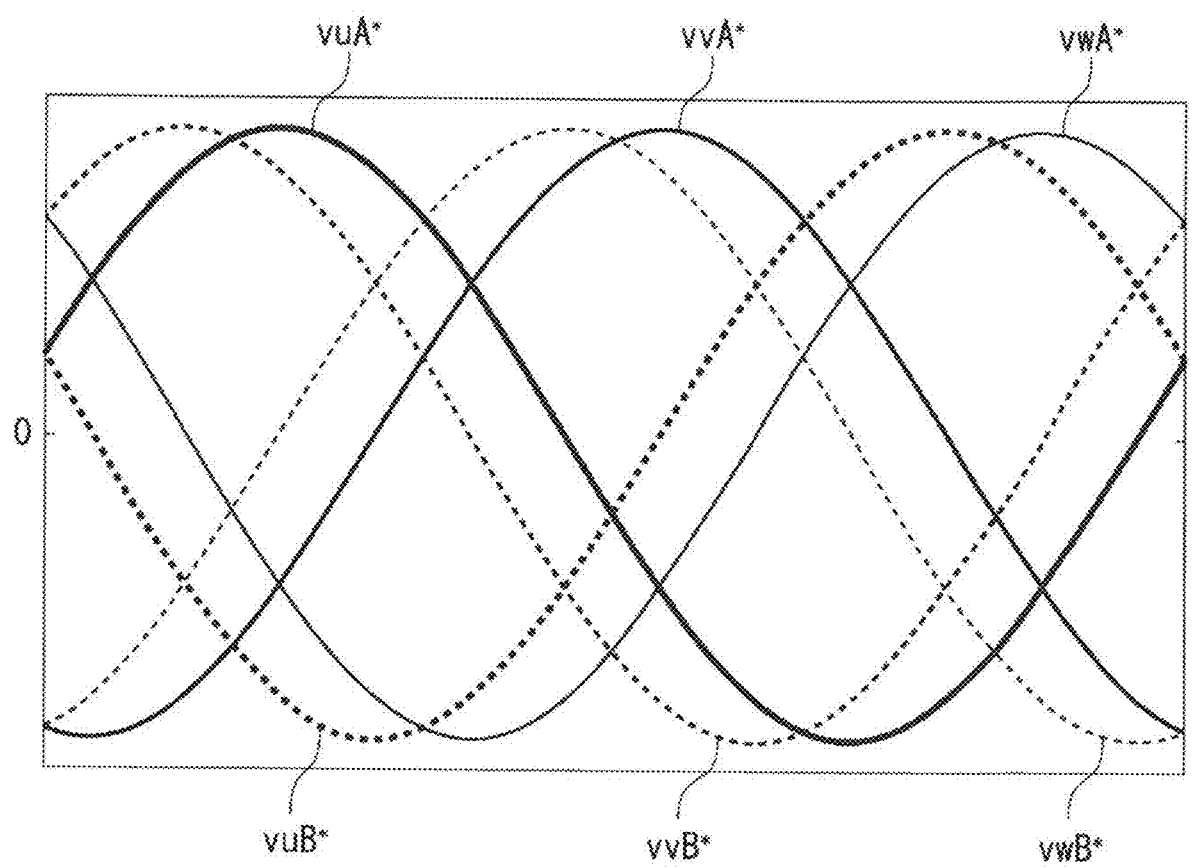
FIG. 14 illustrates the case where the phase difference between the voltage commands for the respective groups is 150° in the rotary machine control device according to embodiment 1.
Figure 15:
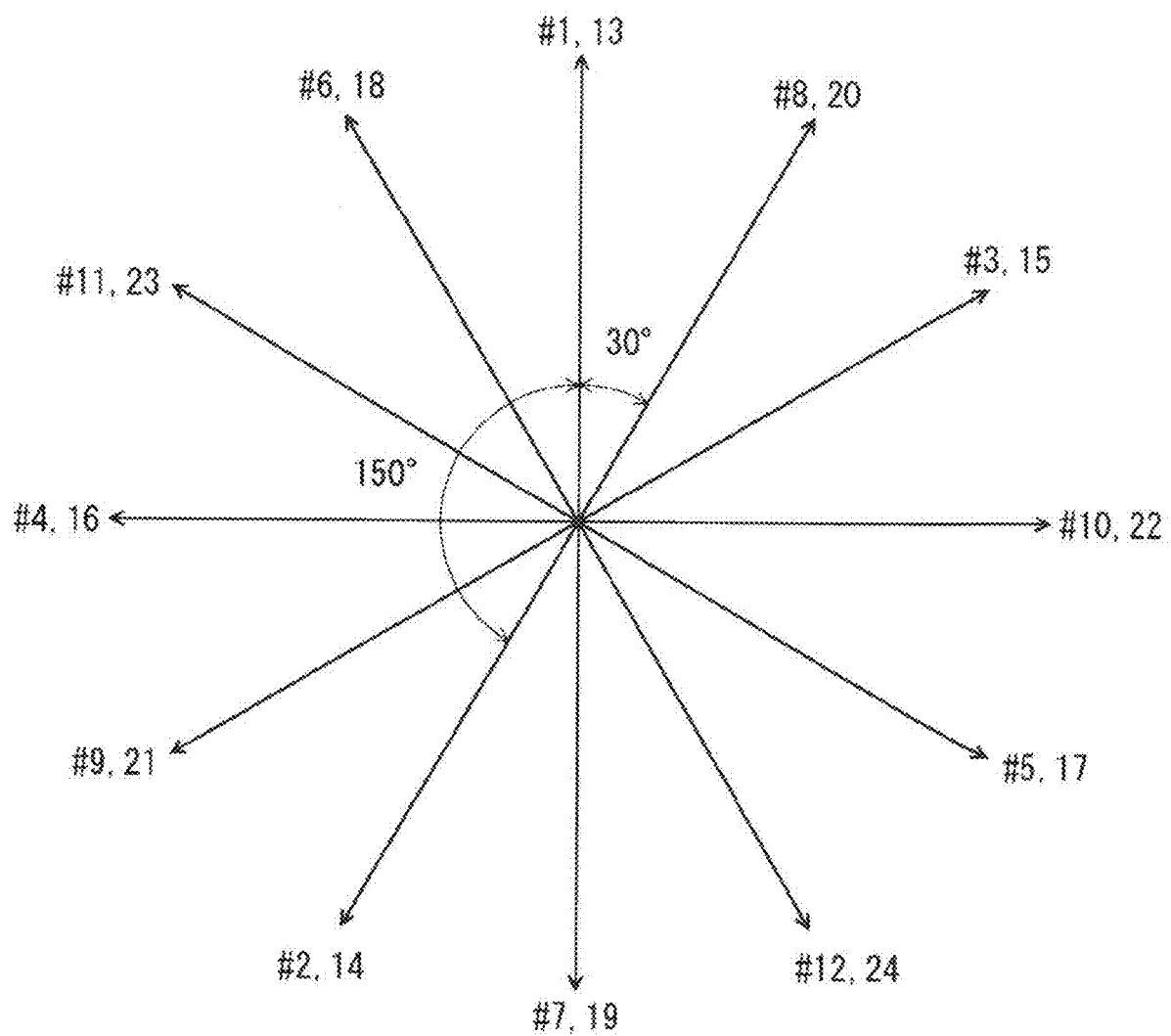
FIG. 15 illustrates windings with a twenty-pole twenty-four-slot structure and the phase of an interlinkage magnetic flux, relevant to the rotary machine control device according to embodiment 1.

FIG. 13 and FIG. 14 show voltage commands for the respective phases in group A and group B in the rotary machine control device 1 of the present embodiment 1.

When the effective value vdq* of the dq-axis voltage commands for group A is smaller than the voltage threshold vth, the voltage commands for group B are provided so as to be reversed from the voltage commands for group A (FIG. 13).

When the effective value vdq* of the dq-axis voltage commands for group A is greater than the voltage threshold vth, the voltage commands for group B are provided so as to have a phase difference of 150° from the voltage commands for group A (FIG. 14).

In the present embodiment 1, an example in which the electric phase difference between the windings for group A and the windings for group B is 150°, is shown. However, the same applies to the case of 210° (=360°−150°), and the electric phase difference in a range of 180°±30° (excluding 180°) is applicable.

In the present embodiment 1, the rotary machine having a ten-pole twelve-slot structure is described as an example. However, for example, in the case of a rotary machine having a twenty-pole twenty-four-slot structure, electric arrangements of windings wound at the respective slots are as shown in FIG. 15.

In this case, options for winding slots in each group increase. For example, if the slots #1, 13, 7, 19 are selected for U phase in group A and the slots #8, 20, 2, 14 are selected for U phase in group B, the electric phase difference between the windings for group A and group B is between 150° and 180°.

The same applies to a rotary machine having a fourteen-pole twelve-slot structure and a rotary machine having a combination of poles and slots corresponding to integer multiples thereof. Further, the same applies to a rotary machine having a sixteen-pole eighteen-slot structure and a rotary machine having a combination of poles and slots corresponding to integer multiples thereof. The electric phase difference between the windings for group A and group B is within a range of 150° to 180° or 180° to 210°.

In the present embodiment 1, triangular wave comparison pulse width modulation (PWM) in which switching signals are generated on the basis of comparison between the voltage command for each phase and a carrier (triangular wave), is used as an example.

The switching signals are generated so that, when the voltage command is greater than the carrier (triangular wave), the upper arm switching element for each phase is turned on and the lower arm switching element is turned off, and when the voltage command is smaller than the carrier, the upper arm switching element is turned off and the lower arm switching element is turned on.

To prevent the upper arm switching element and the lower arm switching element from being turned on at the same time, a dead time is provided when each of the switching elements on the upper arm side and the lower arm side is turned on.

In the rotary machine control device 1 of the present embodiment 1, an example in which the voltage command selection unit 46 performs calculation by Expression (1) to Expression (6) to set the phase difference (θA-θB) between the voltage commands for group A and group B at 180°, has been described. In this case, the upper arm switching element of the switching elements in each phase leg for group A is driven by the same switching signal as the lower arm switching element of the switching elements in each phase leg for group B. In addition, the lower arm switching element of the switching elements in each phase leg for group A is driven by the same switching signal as the upper arm switching element of the switching elements in each phase leg for group B.

As a method for setting the phase difference (θA-θB) between the voltage commands for group A and group B at 180°, besides the method using Expression (1) to Expression (6), the following method may be employed: the upper arm switching element in each phase leg for group B is driven by the same switching signal as the lower arm switching element in each phase leg for group A, and the lower arm switching element in each phase leg for group B is driven by the same switching signal as the upper arm switching element in each phase leg for group A.

Next, occurrence of differences in rising time and falling time of the terminal voltage for each phase in each group, and a method for correcting the time differences, will be described with reference to FIG. 17 and FIG. 18.

First, with reference to FIG. 17, occurrence of differences in rising time and falling time of terminal voltage for each phase in each group will be described, and then, with reference to FIG. 18, a specific circuit configuration for correcting these time differences will be described.

Figure 17:
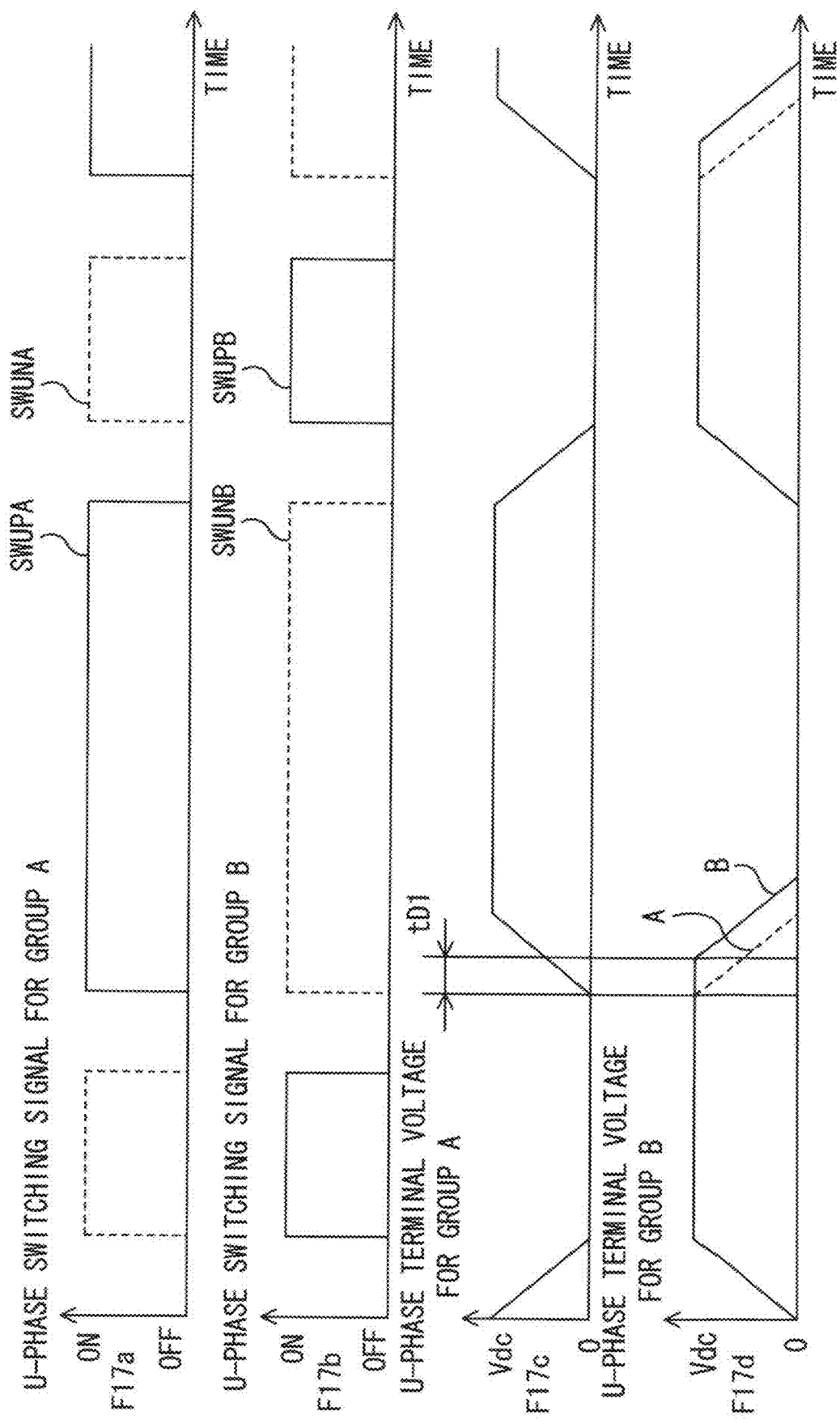
FIG. 17 shows delays of rising times and falling times of terminal voltages in group A and group B according to embodiment 1.

In FIG. 17, F17a indicates a U-phase switching signal for group A, and F17b indicates a U-phase switching signal for group B. Further, F17c indicates a U-phase terminal voltage for group A, and F17d indicates a U-phase terminal voltage for group B. It is noted that "A" in F17d indicates an ideal U-phase terminal voltage for group B and "B" indicates an actual U-phase terminal voltage for group B.

Other than dead time, differences can also occur in the rising time and the falling time of the actual terminal voltage for each phase in each group, relative to the switching signals inputted to the upper arm switching elements and the lower arm switching elements.

For example, FIG. 17 shows the case where the time at which falling of U-phase terminal voltage for group B is started is delayed relative to the switching signal, and thus is delayed by time tD1 relative to the time at which rising of U-phase terminal voltage for group A is started.

To enhance the effect of canceling out electromagnetic noises between the groups, it is desirable that there is no time difference in rising or falling of terminal voltage for each phase in each group.

In this case, it is effective to perform time manipulation in consideration of delay time tD1 for the switching signals outputted from the switching signal generation unit 50.

Figure 18:
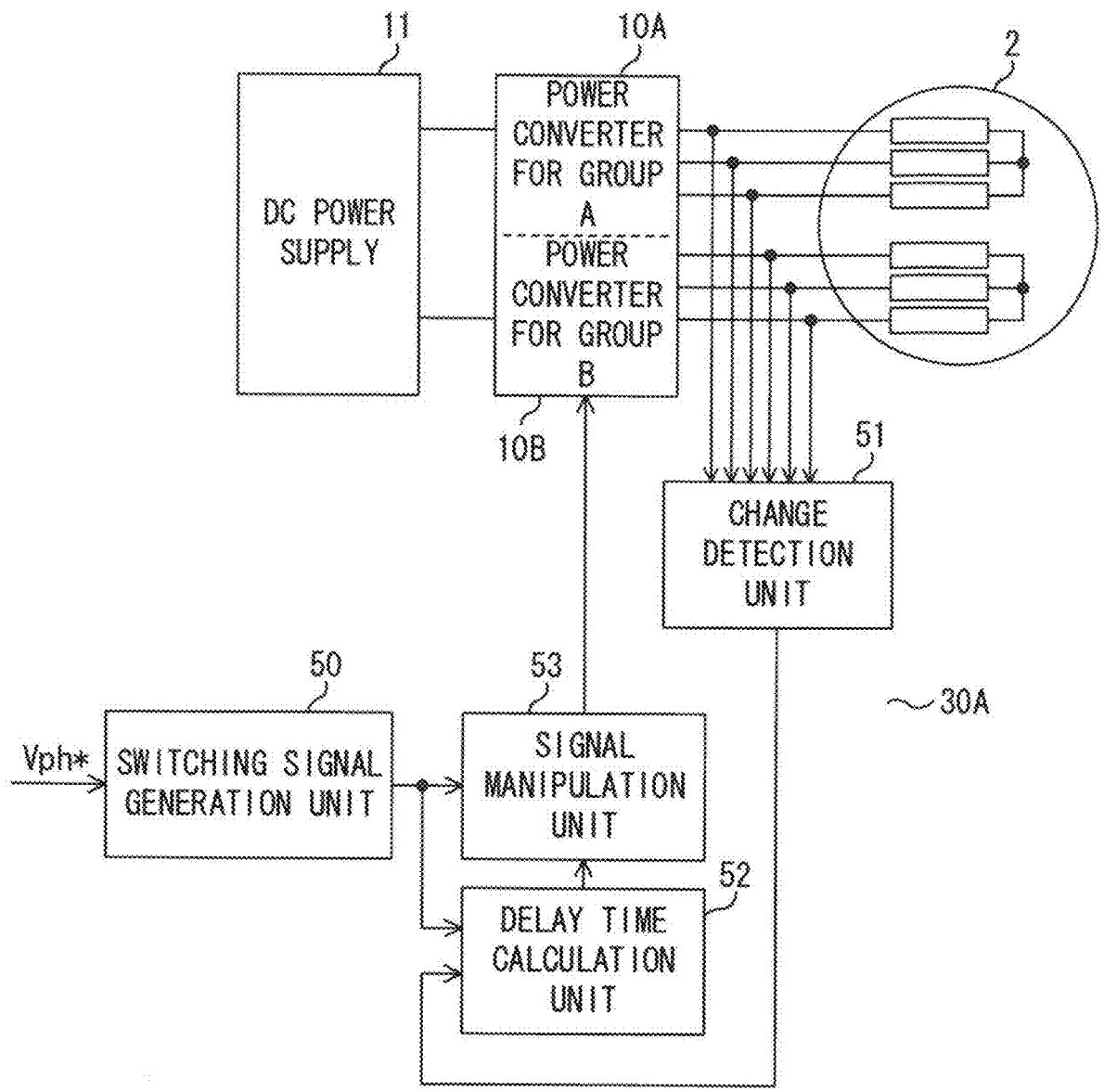
FIG. 18 is a function block diagram for correcting delays of rising times and falling times of terminal voltages in group A and group B according to embodiment 1.

FIG. 18 is a diagram illustrating a specific circuit configuration for correcting the time differences, and only added components and relevant components are shown.

The parts that are the same as or correspond to those in FIG. 1, FIG. 7, and FIG. 8 are denoted by the same reference characters. In addition, the control unit is denoted by 30A for discrimination from the control unit 30 shown in FIG. 1 and FIG. 7.

In FIG. 18, the control unit 30A additionally has a change detection unit 51, a delay time calculation unit 52, and a signal manipulation unit 53.

The change detection unit 51 detects timings of rising and falling of terminal voltage for each phase in group A and group B.

On the basis of the timings of rising and falling of terminal voltage for each phase in group A and group B detected by the change detection unit 51, and the output signals from the switching signal generation unit 50 (switching signals to be given to the switching elements of the upper and lower arms for each phase in each group), the delay time calculation unit 52 calculates the delay time tD1 of rising/falling of terminal voltage for each phase in group A and group B relative to the output signal from the switching signal generation unit 50. The delay time can be calculated using a counter function provided to a control IC, for example.

At the time of updating the switching signals, the signal manipulation unit 53 manipulates ON/OFF time of the switching signal for the phase in which rising/falling of terminal voltage is delayed, among the phases in group A and group B, on the basis of the delay time tD1 calculated by the delay time calculation unit 52.

Thus, the delay time of change of the terminal voltage relative to the switching signal can be corrected.

When the effective value vdq* of the dq-axis voltage commands for group A is greater than the voltage threshold vth, the phase of the carrier for group B may be manipulated relative to the phase of the carrier for group A, in consideration of loss and current ripple.

As shown in FIG. 16, the carrier frequency (Fc) may be changed in synchronization with either or both of the top and the bottom of the carrier. In FIG. 16, the carrier frequency (Fc) is changed at the bottoms of the carrier, in order of Fc2, Fc1, Fc3, and then Fc2.

Next, effects obtained by setting the phase difference between the voltage commands for group A and group B in the rotary machine 2 to 180° will be described.

Figure 19:
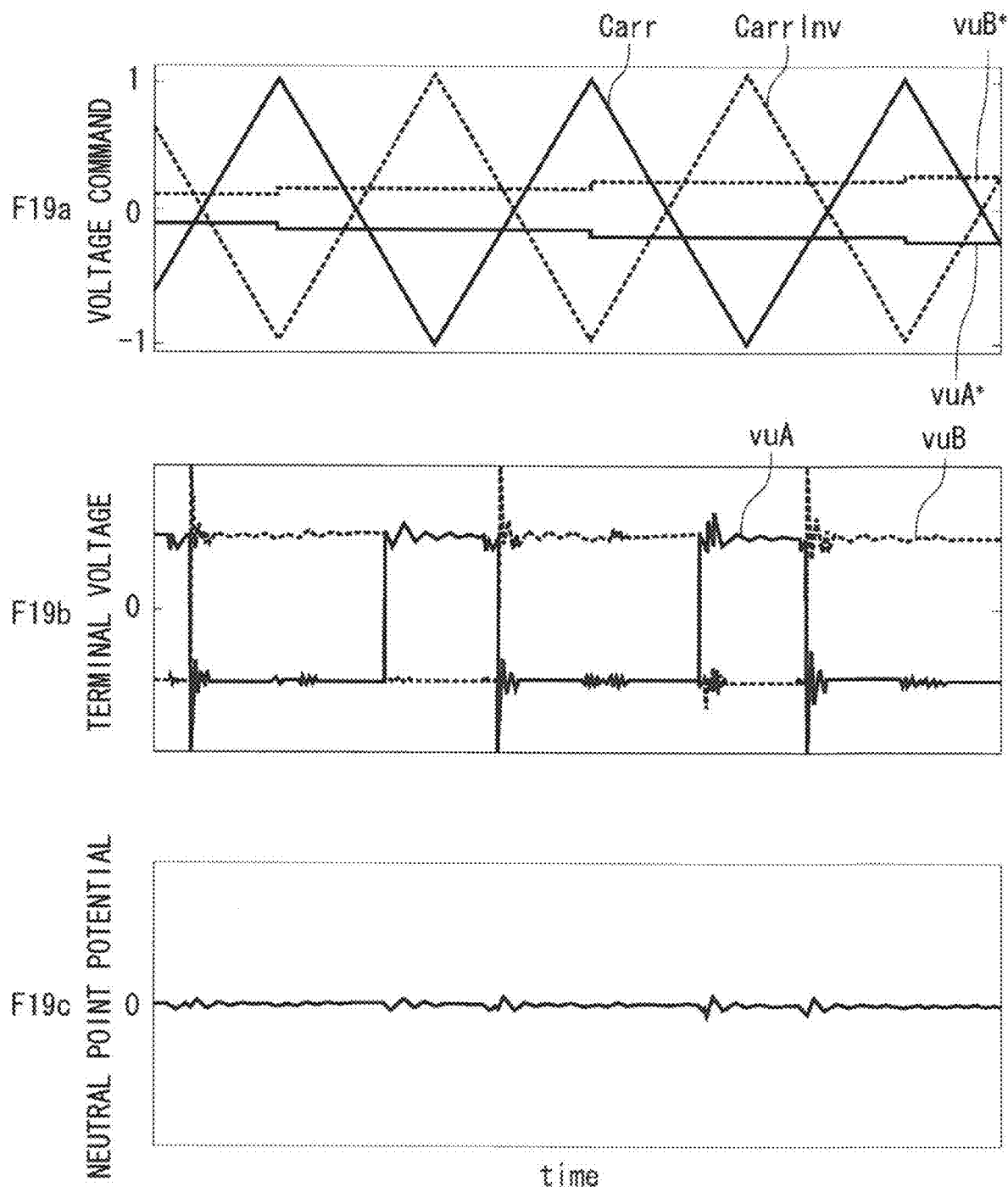
FIG. 19 illustrates voltage commands, terminal voltages, and a neutral point potential when the phase difference between voltage commands for the respective groups is 180° in the rotary machine control device according to embodiment 1.

In FIG. 19, F19a to F19c show changes in voltage commands, the terminal voltages, and the neutral point potential when the phase difference between the voltage commands for group A and group B is 180°.

F19a in FIG. 19 shows changes in the U-phase voltage command for group A, the U-phase voltage command in group B, and the carrier. F19b in FIG. 19 shows changes in the U-phase terminal voltage for group A and the U-phase terminal voltage for group B. F19c in FIG. 19 shows change in the neutral point potential.

In FIG. 20, F20a to F20c show changes in the voltage commands, the terminal voltages, and the neutral point potential when the phase difference between the voltage commands for group A and group B is 0°.

F20a in FIG. 20 shows changes in the U-phase voltage command for group A, the U-phase voltage command for group B, and the carrier. F20b in FIG. 20 shows changes in the U-phase terminal voltage for group A and the U-phase terminal voltage for group B. F20c in FIG. 20 shows change in the neutral point potential.

As is found from FIG. 19 and FIG. 20, in the case of performing triangular wave comparison PWM in the condition in which the phase difference between the voltage commands for group A and group B is 180° and the phase difference between the carriers for the respective groups is 180°, rising and falling of the neutral point potentials for group A and group B are synchronized with each other, whereby leakage current occurring due to change in the neutral point potential is canceled out between group A and group B. Thus, electromagnetic noise is reduced.

With the configuration of the rotary machine control device 1 according to embodiment 1, the rotary machine drive system for driving the rotary machine having a two-group three-phase winding structure can perform operation such that, in a condition that the effective value of the voltage command is low so that electromagnetic noise increases, the phase difference between the voltage commands for the respective groups is set to 180°, and in a condition that a great output torque is required, the phase difference of θcoil is provided between the voltage commands for the respective groups.

Methods for canceling out leakage current between the respective groups by setting the phase difference between the voltage commands for the respective groups at 180° include a method of reversely giving switching signals for the upper arm switching element and the lower arm switching element for each phase between the groups, and a method of performing triangular wave comparison PWM while reversing the carrier for group A and the carrier for group B from each other.

Thus, in the rotary machine control device 1 according to embodiment 1, on the basis of the effective value of the voltage command and the voltage threshold, in the condition that electromagnetic noise increases, leakage current occurring due to switching is canceled out between the groups, whereby the electromagnetic noise can be reduced. In addition, in the condition that a great output torque is required, output torque can be improved.

Thus, in the rotary machine control device 1 according to embodiment 1, because electromagnetic noise can be reduced, a noise filter can be downsized. In addition, because the maximum output torque is improved, the rotary machine can also be downsized.

As described above, the rotary machine control device according to embodiment 1 is a rotary machine control device for controlling a rotary machine having a two-group three-phase configuration, wherein the phase difference θcoil of 150° to 210° (excluding) 180° is electrically provided between the windings for the respective groups. When the effective value of the voltage command is smaller than the voltage threshold, the phase difference between the voltage commands for the respective groups is set to 180°, and when the torque command is greater than the torque threshold, the phase difference between the voltage commands for the respective groups is set to θcoil. That is, the phase difference between the voltage commands for an odd-number group and an even-number group of the rotary machine is switched between 180° and θcoil. Thus, it is possible to provide a rotary machine control device capable of applying control for suppressing electromagnetic noise in a drive condition that electromagnetic noise increases, and outputting maximum torque in a condition that maximum torque is required.

Although the application is described above in terms of an exemplary embodiment, it should be understood that the various features, aspects, and functionality described in the embodiment are not limited in their applicability to the particular embodiment with which they are described, but instead can be applied alone or in various combinations to the embodiment of the application.

It is therefore understood that numerous modifications which have not been exemplified can be devised without departing from the scope of the present application. For example, at least one of the constituent components may be modified, added, or eliminated.

INDUSTRIAL APPLICABILITY

The present application enables reduction in electromagnetic noise occurring in a rotary machine drive system, while maintaining the maximum torque of a motor, and thus is widely applicable to rotary machine control devices.

DESCRIPTION OF THE REFERENCE CHARACTERS 1 rotary machine control device
2 rotary machine
10A, 10B power converter
11 DC power supply
12 smoothing capacitor
13a to 13f, 14a to 14f switching element
25 current detector
26 angle detector
30, 30A control unit
40 voltage command generation unit
41 table
42 intergroup voltage phase difference determination unit
43A, 43B uvw-dq coordinate converter
44A, 44B PI controller
45A, 45B dq-uvw coordinate converter
46 voltage command selection unit
50 switching signal generation unit
51 change detection unit
52 delay time calculation unit
53 signal manipulation unit
100 rotary machine drive system

The invention claimed is:

1. A rotary machine control device for controlling a rotary machine having a multi-group multiphase configuration, the rotary machine control device comprising:
a power converter formed by connecting a plurality of phase legs in parallel, each phase leg having an upper arm switching element and a lower arm switching element connected in series to each other; and a controller for generating switching signals for switching the upper arm switching elements and the lower arm switching elements, to control the rotary machine, wherein a phase difference θcoil in a range of 150°≤θcoil<180° or 180°<θcoil≤210° is electrically provided between a winding for an odd-number group and a winding for an even-number group in the rotary machine, and wherein a phase difference between a voltage command for the odd-number group and a voltage command for the even-number group in the rotary machine is set to 180° when an effective value of the voltage command for either of the odd-number group or the even-number group is equal to or smaller than a voltage threshold, and the phase difference between the voltage command for the odd-number group and the voltage command for the even-number group in the rotary machine is set to θcoil when the effective value of the voltage command is larger than the voltage threshold.

2. The rotary machine control device according to claim 1, wherein
when a torque command is greater than a torque threshold, the phase difference between the voltage command for the odd-number group and the voltage command for the even-number group in the rotary machine is set to θcoil.

3. The rotary machine control device according to claim 2, wherein
the rotary machine has a two-group three-phase winding structure,
a ratio of a number of poles and a number of slots in the rotary machine is 5:6, and
winding arrangement is made such that a phase difference of 150° is electrically provided between the two groups of windings in the rotary machine.

4. The rotary machine control device according to claim 2, wherein
when the phase difference between the voltage command for the odd-number group and the voltage command for the even-number group in the rotary machine is set to 180°, the upper arm switching element in each phase leg for the odd-number group is driven by the same switching signal as the lower arm switching element in each phase leg for the even-number group, and the lower arm switching element in each phase leg for the odd-number group is driven by the same switching signal as the upper arm switching element in each phase leg for the even-number group.

5. The rotary machine control device according to claim 2, wherein
when the phase difference between the voltage command for the odd-number group and the voltage command for the even-number group in the rotary machine is set to 180° and the switching signals are generated through triangular wave comparison PWM, a carrier for the odd-number group and a carrier for the even-number group are reversed from each other.

6. The rotary machine control device according to claim 2, wherein
the controller changes, in a ramp shape, the phase difference between the voltage command for the odd-number group and the voltage command for the even-number group in the rotary machine, when changing the phase difference from 180° to θcoil or from θcoil to 180°.

7. The rotary machine control device according to claim 2, wherein
the controller sets hysteresis when changing the phase difference between the voltage command for the odd-number group and the voltage command for the even-number group in the rotary machine from 180° to θcoil or from θcoil to 180°.

8. The rotary machine control device according to claim 2, wherein
the controller includes a signal manipulation unit for performing time manipulation on the switching signals for the upper arm switching element and the lower arm switching element for each phase in each group, on the basis of a time difference of rising/falling start time of terminal voltage for each phase in each group in the rotary machine relative to the switching signals for the upper arm switching element and the lower arm switching element.

9. The rotary machine control device according to claim 8, wherein
the controller further includes a change detection unit for detecting change in the terminal voltage for each phase in each group, and a delay time calculation unit for calculating a delay time on the basis of a difference of rising/falling time of the terminal voltage for each phase in each group detected by the change detection unit, relative to the switching signals for the upper arm switching element and the lower arm switching element, and
the signal manipulation unit performs time manipulation of ON/OFF times of the switching signals for the upper arm switching element and the lower arm switching element for each phase in each group, on the basis of the delay time.

10. The rotary machine control device according to claim 1, wherein
the rotary machine has a two-group three-phase winding structure,
a ratio of a number of poles and a number of slots in the rotary machine is 5:6, and
winding arrangement is made such that a phase difference of 150° is electrically provided between the two groups of windings in the rotary machine.

11. The rotary machine control device according to claim 10, wherein
when the phase difference between the voltage command for the odd-number group and the voltage command for the even-number group in the rotary machine is set to 180°, the upper arm switching element in each phase leg for the odd-number group is driven by the same switching signal as the lower arm switching element in each phase leg for the even-number group, and the lower arm switching element in each phase leg for the odd-number group is driven by the same switching signal as the upper arm switching element in each phase leg for the even-number group.

12. The rotary machine control device according to claim 10, wherein
when the phase difference between the voltage command for the odd-number group and the voltage command for the even-number group in the rotary machine is set to 180° and the switching signals are generated through triangular wave comparison PWM, a carrier for the odd-number group and a carrier for the even-number group are reversed from each other.

13. The rotary machine control device according to claim 1, wherein
when the phase difference between the voltage command for the odd-number group and the voltage command for the even-number group in the rotary machine is set to 180°, the upper arm switching element in each phase leg for the odd-number group is driven by the same switching signal as the lower arm switching element in each phase leg for the even-number group, and the lower arm switching element in each phase leg for the odd-number group is driven by the same switching signal as the upper arm switching element in each phase leg for the even-number group.

14. The rotary machine control device according to claim 1, wherein
when the phase difference between the voltage command for the odd-number group and the voltage command for the even-number group in the rotary machine is set to 180° and the switching signals are generated through triangular wave comparison PWM, a carrier for the odd-number group and a carrier for the even-number group are reversed from each other.

15. The rotary machine control device according to claim 14, wherein
the controller variably sets a carrier frequency of the carrier.

16. The rotary machine control device according to claim 15, wherein
the controller switches the carrier frequency at either or both of a top and a bottom of the carrier.

17. The rotary machine control device according to claim 1, wherein
the controller changes, in a ramp shape, the phase difference between the voltage command for the odd-number group and the voltage command for the even-number group in the rotary machine, when changing the phase difference from 180° to θcoil or from θcoil to 180°.

18. The rotary machine control device according to claim 1, wherein
the controller sets hysteresis when changing the phase difference between the voltage command for the odd-number group and the voltage command for the even-number group in the rotary machine from 180° to θcoil or from θcoil to 180°.

19. The rotary machine control device according to claim 1, wherein
the controller includes a signal manipulation unit for performing time manipulation on the switching signals for the upper arm switching element and the lower arm switching element for each phase in each group, on the basis of a time difference of rising/falling start time of terminal voltage for each phase in each group in the rotary machine relative to the switching signals for the upper arm switching element and the lower arm switching element.

20. The rotary machine control device according to claim 19, wherein
the controller further includes a change detection unit for detecting change in the terminal voltage for each phase in each group, and a delay time calculation unit for calculating a delay time on the basis of a difference of rising/falling time of the terminal voltage for each phase in each group detected by the change detection unit, relative to the switching signals for the upper arm switching element and the lower arm switching element, and
the signal manipulation unit performs time manipulation of ON/OFF times of the switching signals for the upper arm switching element and the lower arm switching element for each phase in each group, on the basis of the delay time.

* * * * *